US012592526B2

(12) United States Patent
Kim et al.

(10) Patent No.: US 12,592,526 B2
(45) Date of Patent: Mar. 31, 2026

(54) BOARD CONNECTOR WITH SHIELDING BETWEEN RADIO FREQUENCY TERMINALS AND NON-RADIO FREQUENCY TERMINALS

(71) Applicant: LS MTRON LTD., Anyang-si (KR)

(72) Inventors: Dong Wan Kim, Anyang-si (KR); Sang Jun Oh, Anyang-si (KR); Hyun Joo Hwang, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 344 days.

(21) Appl. No.: 18/037,962

(22) PCT Filed: Jul. 23, 2021

(86) PCT No.: PCT/KR2021/009552
§ 371 (c)(1),
(2) Date: May 19, 2023

(87) PCT Pub. No.: WO2022/108036
PCT Pub. Date: May 27, 2022

(65) Prior Publication Data

US 2023/0411911 A1 Dec. 21, 2023

(30) Foreign Application Priority Data

Nov. 20, 2020 (KR) ........................ 10-2020-0156776
Jul. 14, 2021 (KR) ........................ 10-2021-0092328

(51) Int. Cl.
*H01R 13/6597* (2011.01)
*H01R 12/71* (2011.01)
(Continued)

(52) U.S. Cl.
CPC ....... *H01R 13/6597* (2013.01); *H01R 12/716* (2013.01); *H01R 12/71* (2013.01);
(Continued)

(58) Field of Classification Search
CPC .. H01R 13/6597; H01R 12/716; H01R 12/71; H01R 12/712; H01R 12/714;
(Continued)

(56) References Cited

U.S. PATENT DOCUMENTS

| | | | | |
|---|---|---|---|---|
| 2018/0183189 A1 | 6/2018 | Chuang | | |
| 2018/0198241 A1* | 7/2018 | Ooi | .................... | H01R 13/6597 |
| 2021/0288402 A1* | 9/2021 | Su | ...................... | H01R 13/6582 |

FOREIGN PATENT DOCUMENTS

| | | |
|---|---|---|
| JP | 2020102462 A | 7/2020 |
| JP | 2021039864 A | 3/2021 |

(Continued)

OTHER PUBLICATIONS

Office Action for related Japanese Patent Application No. 2023-520385; action dated Mar. 22, 2024; (7 pages).

(Continued)

*Primary Examiner* — Justin M Kratt
(74) *Attorney, Agent, or Firm* — K&L Gates LLP

(57) ABSTRACT

The present disclosure relates to a board connector comprising: a plurality of radio frequency (RF) contacts for transmitting an RF signal; an insulating part supporting the RF contacts; a plurality of transmission contacts coupled to the insulating part; a ground housing having the insulating part coupled thereto; a first ground contact coupled to the insulating part and shielding between a first RF contact from among the RF contacts and the transmission contacts; and a second ground contact coupled to the insulating part and shielding between a second RF contact from among the RF contacts and the transmission contacts, wherein the first ground contact comprises a first shielding member shielding between the first RF contact and the transmission contacts with respect to a first axial direction and shielding between the first RF contact and the transmission contacts with (Continued)

respect to a second axial direction perpendicular to the first axial direction.

20 Claims, 16 Drawing Sheets

(51) Int. Cl.

| | |
|---|---|
| *H01R 12/73* | (2011.01) |
| *H01R 13/648* | (2006.01) |
| *H01R 13/658* | (2011.01) |
| *H01R 13/6581* | (2011.01) |
| *H01R 13/6582* | (2011.01) |
| *H01R 13/6585* | (2011.01) |
| *H01R 13/6591* | (2011.01) |
| *H01R 13/6594* | (2011.01) |

(52) U.S. Cl.
CPC .......... *H01R 12/712* (2013.01); *H01R 12/714* (2013.01); *H01R 12/73* (2013.01); *H01R 13/648* (2013.01); *H01R 13/658* (2013.01); *H01R 13/6581* (2013.01); *H01R 13/6582* (2013.01); *H01R 13/6585* (2013.01); *H01R 13/6591* (2013.01); *H01R 13/6594* (2013.01)

(58) Field of Classification Search
CPC .... H01R 12/73; H01R 13/648; H01R 13/658; H01R 13/6581; H01R 13/6582; H01R 13/6585; H01R 13/6591; H01R 13/6594
See application file for complete search history.

(56) References Cited

FOREIGN PATENT DOCUMENTS

| | | | |
|---|---|---|---|
| KR | 20170015125 | A | 2/2017 |
| KR | 20170129066 | A | 11/2017 |
| KR | 20180081441 | A | 7/2018 |
| KR | 20200008840 | A | 1/2020 |

OTHER PUBLICATIONS

International Search Report for related International Application No. PCT/KR2021/009552, dated Nov. 18, 2021 3 Pages.
Written Opinion for related International Application No. PCT/KR2021/009552, dated Nov. 18, 2021 6 Pages.
Office Action for related Japanese Application No. 2025-069690; action dated Jan. 6, 2026; (4 pages).

* cited by examiner

BOARD CONNECTOR WITH SHIELDING BETWEEN RADIO FREQUENCY TERMINALS AND NON-RADIO FREQUENCY TERMINALS

CROSS-REFERENCE TO RELATED APPLICATIONS

The present application is a National Stage of International Application No. PCT/KR2021/009552 filed on Jul. 23, 2021, which claims priority to and the benefit of Korean Patent Application No. 10-2020-0156776, filed on Nov. 20, 2020, and Korean Patent Application No. 10-2021-0092328, filed on Jul. 14, 2021, the disclosures of which are incorporated herein by reference in their entirety.

FIELD

The present disclosure relates to a board connector which is installed in an electronic device for electrical connection between boards.

BACKGROUND

A connector is provided in various electronic devices for electrical connection. For example, the connector is installed in an electronic device such as a mobile phone, a computer, a tablet computer and the like such that various parts installed in the electronic device can be electrically connected to each other.

In general, among electronic devices, a radio frequency (RF) connector and a board-to-board connector (hereinafter, referred to as a 'board connector') are provided inside wireless communication devices such as smart phones, tablet PCs and the like. The RF connector transmits an RF signal. The board connector processes digital signals such as cameras.

Such RF connectors and board connectors are mounted on a printed circuit board (PCB). Conventionally, since several board connectors and RF connectors are mounted together with a large number of components in a limited PCB space, there is a problem in that the PCB mounting area becomes large. Accordingly, in accordance with the trend of miniaturization of smartphones, there is a need for a technique for optimizing a small PCB mounting area by integrating an RF connector and a board connector.

FIG. 1 is a schematic perspective view of a board connector according to the related art.

Referring to FIG. 1, a board connector 100 according to the related art includes a first connector 110 and a second connector 120.

The first connector 110 is to be coupled to a first board (not illustrated). The first connector 110 may be electrically connected to the second connector 120 through a plurality of first contacts 111.

The second connector 120 is to be coupled to a second board (not illustrated). The second connector 120 may be electrically connected to the first connector 110 through a plurality of second contacts 121.

The board connector 100 according to the related art may electrically connect the first board and the second board to each other as the first contacts 111 and the second contacts 121 are connected to each other. In addition, when some contacts among the first contacts 111 and the second contacts 121 are used as RF contacts for RF signal transmission, the board connector 100 according to the related art may be implemented such that an RF signal is transmitted between the first board and the second board through the RF contact.

Herein, the board connector 100 according to the related art has the following problems.

First, in the board connector 100 according to the related art, when using contacts that are spaced apart by a relatively short distance among the contacts 111, 121 as the RF contacts, there is a problem in that signal transmission is not performed smoothly between the RF contacts 111', 111", 121', 121" due to RF signal interference.

Second, since the board connector 100 according to the related art has an RF signal shielding part 112 in the outermost part of the connector, radiation to the outside of the RF signal can be shielded, but the shielding between the RF signals is not performed.

Third, in the board connector 100 according to the related art, the RF contacts 111', 111", 121', 121" include mounting parts **111*a*', 111*a*", 121*a*', 121*a*" mounted on the board, respectively, and the mounting parts 111*a*', 111*a*", 121*a*', 121*a*" are disposed to be exposed to the outside. Accordingly, the board connector 100 according to the related art has a problem in that the shielding for the mounting parts 111*a*', 111*a*" 121*a*', 121*a*"** is not performed.

SUMMARY

The present disclosure has been devised to solve the above-described problems, and an object of the present disclosure to provide a board connector which is capable of reducing the possibility of generating RF signal interference between RF contacts.

In order to solve the above problems, the present disclosure may include the following configurations.

The board connector according to the present disclosure may include a plurality of RF contacts for transmitting a radio frequency (RF) signal; an insulating part for supporting the RF contacts; a plurality of transmission contacts coupled to the insulating part; a ground housing having the insulating part coupled thereto; a first ground contact coupled to the insulating part and shielding between a first RF contact from among the RF contacts and the transmission contacts; and a second ground contact coupled to the insulating part and shielding between a second RF contact from among the RF contacts and the transmission contacts. The first ground contact may include a first shielding member shielding between the first RF contact and the transmission contacts with respect to a first axial direction and shielding between the first RF contact and the transmission contacts with respect to a second axial direction which is perpendicular to the first axial direction.

The board connector according to the present disclosure may include a plurality of RF contacts for transmitting a radio frequency (RF) signal; an insulating part for supporting the RF contacts; a plurality of transmission contacts coupled to the insulating part; a ground housing having the insulating part coupled thereto; a first ground contact coupled to the insulating part and shielding between a first RF contact from among the RF contacts and the transmission contacts; and a second ground contact coupled to the insulating part and shielding between a second RF contact from among the RF contacts and the transmission contacts. A ground arm which is connected to a ground contact of a counterpart connector and moves elastically may be formed on the first ground contact and the second ground contact.

According to the present disclosure, the following effects can be achieved.

According to the present disclosure, it is possible to implement a shielding function of signals, electromagnetic waves and the like for RF contacts by using a ground housing and a ground contact. Accordingly, the present disclosure can prevent electromagnetic waves generated from RF contacts from interfering with signals of circuit components located in the vicinity of electronic devices, and can prevent electromagnetic waves generated from circuit components located in the vicinity of electronic devices from interfering with RF signals. Therefore, the present disclosure can contribute to improving the EMI (Electro Magnetic Interference) shielding performance and EMC (Electro Magnetic Compatibility) performance by using a ground housing and a ground contact.

According to the present disclosure, the first RF contact and the second RF contact are disposed asymmetrically with respect to the first axial direction and the second axial direction, thereby reducing the possibility of generating RF signal interference between the RF contacts and miniaturizing the size.

DETAILED DESCRIPTION

Figure 8:
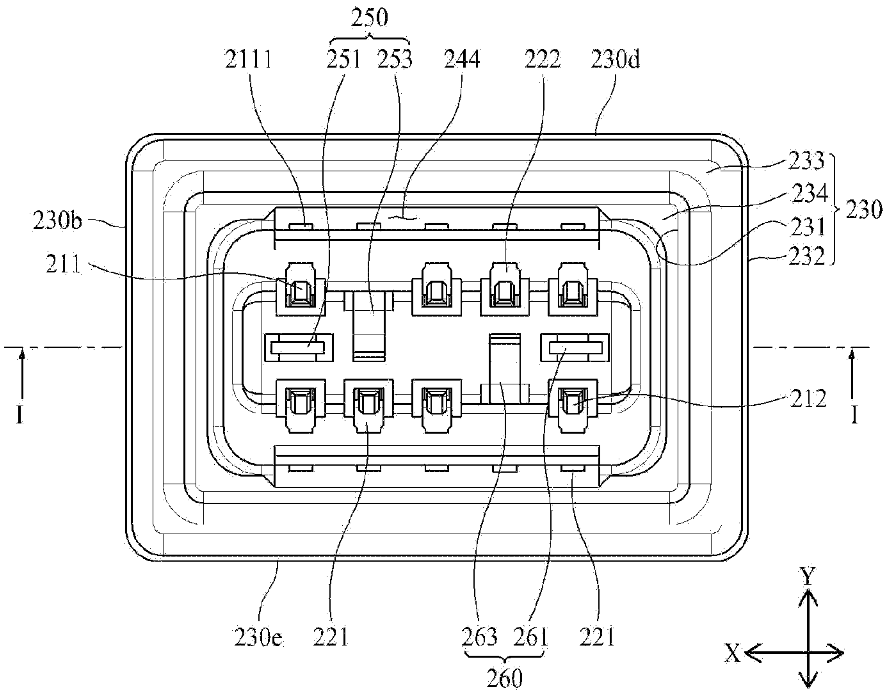
FIG. 8 is a schematic plan view of the board connector according to the first example.

Hereinafter, the exemplary embodiments of a board connector according to the present disclosure will be described in detail with reference to the accompanying drawings. FIG. 8 illustrates the connector according to the first example and the connector according to the second example coupled along the direction illustrated in FIG. 3.

Figure 1:
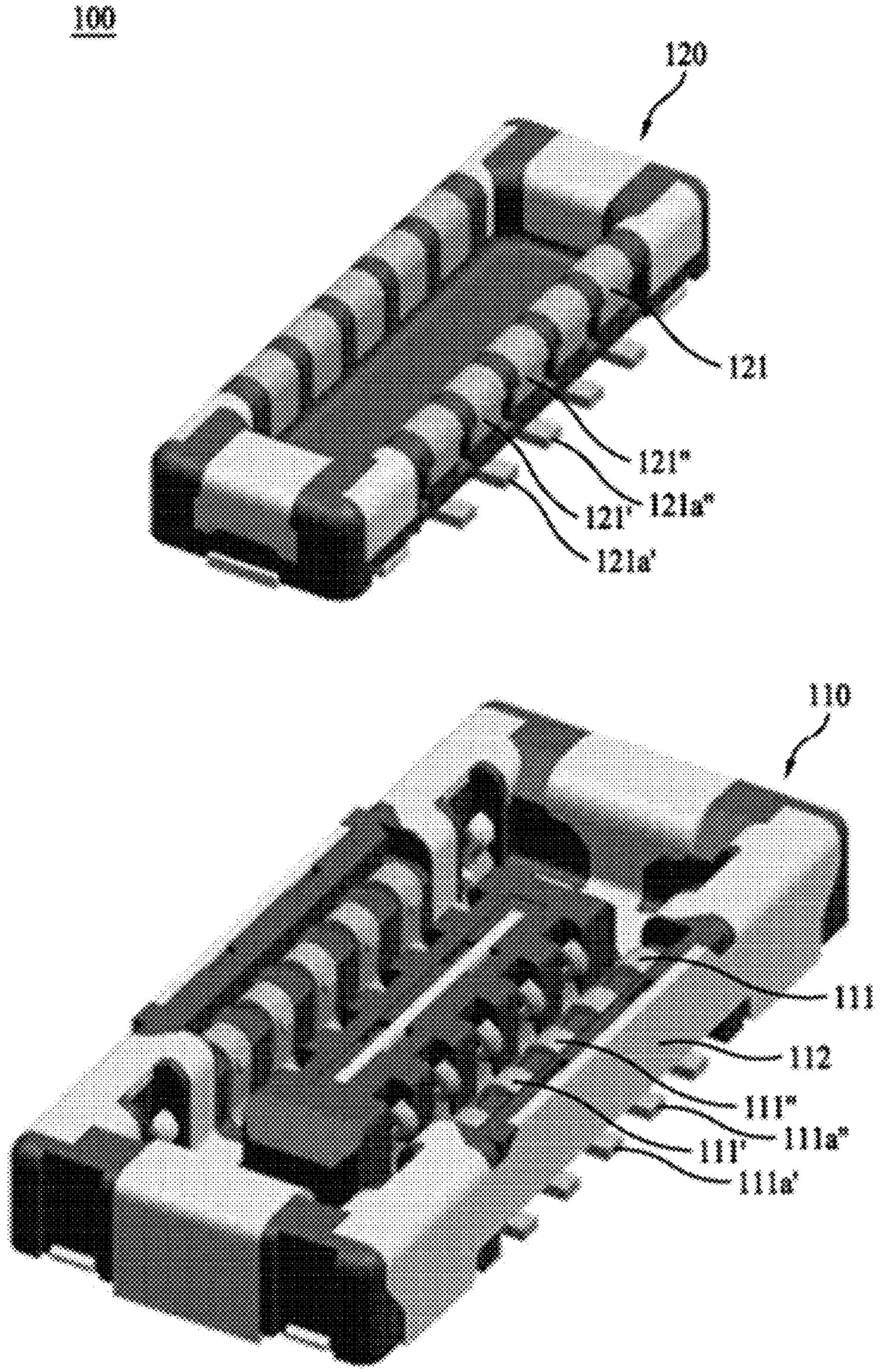
FIG. 1 (PRIOR ART)
FIG. 1 is a schematic perspective view of a board connector according to the related art.
Figure 2:
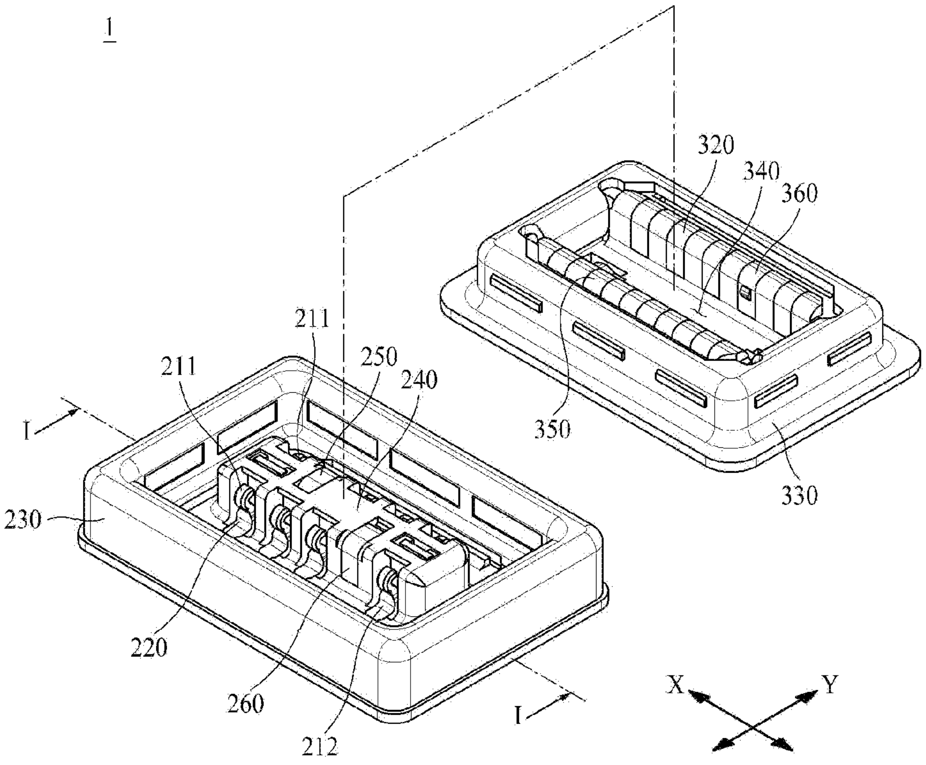
FIG. 2 is a schematic perspective view of a receptacle connector and a plug connector in the board connector according to the present disclosure.

Referring to FIG. 2, the board connector 1 according to the present disclosure may be installed in an electronic device (not illustrated) such as a mobile phone, a computer, a tablet computer or the like. The board connector 1 according to the present disclosure may be used to electrically connect a plurality of boards (not illustrated). The boards may be printed circuit boards (PCBs). For example, when the first board and the second board are electrically connected, a receptacle connector mounted on the first board and a plug connector mounted on the second board may be connected to each other. Accordingly, the first board and the second board may be electrically connected to each other through the receptacle connector and the plug connector. A plug connector mounted on the first board and a receptacle connector mounted on the second board may be connected to each other.

The board connector 1 according to the present disclosure may be implemented as the receptacle connector. The board connector 1 according to the present disclosure may be implemented as the plug connector. The board connector 1 according to the present disclosure may be implemented by including both of the receptacle connector and the plug connector.

Hereinafter, an exemplary embodiment in which the board connector 1 according to the present disclosure is implemented as the receptacle connector is defined as the board connector 200 according to the first example, and an exemplary embodiment in which the board connector 1 according to the present disclosure is implemented as the plug connector is defined as the board connector 300 according to the second example to describe the present disclosure in detail with reference to the accompanying drawings. In addition, it will be described as an exemplary embodiment in which the board connector 200 according to the first example is mounted on the first board and the board connector 300 according to the second example is mounted on the second board as a reference. From this, it will be apparent to those skilled in the art to derive an exemplary embodiment in which the board connector 1 according to the present disclosure includes both of the receptacle connector and the plug connector.

Board Connector 200 According to the First Example

Figure 3:
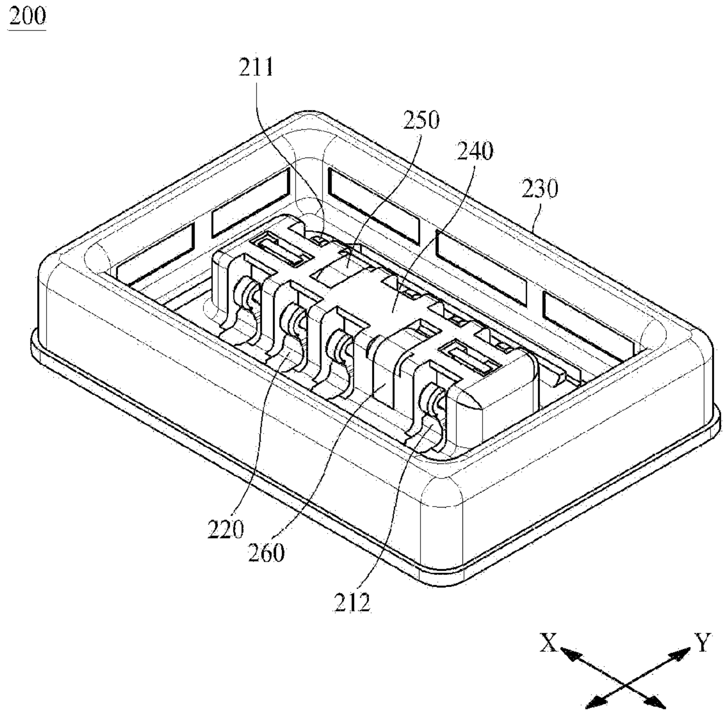
FIG. 3 is a schematic perspective view of a board connector according to the first example.
Figure 4:
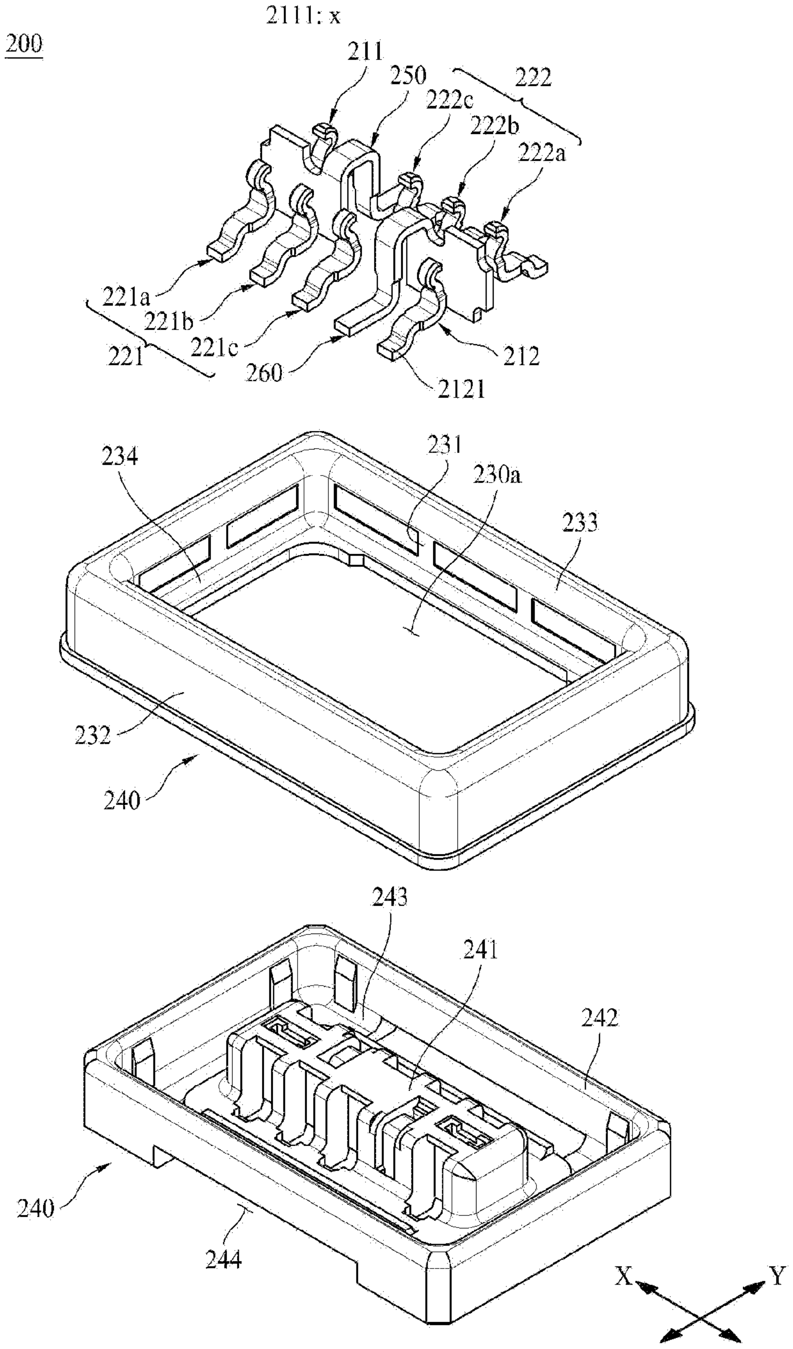
FIG. 4 is a schematic exploded perspective view of the board connector according to the first example.

Referring to FIGS. 2 to 4, the board connector 200 according to the first example includes a plurality of RF contacts 210, a plurality of transmission contacts 220, a ground housing 230 and an insulating part 240.

The RF contacts 210 are for transmitting a radio frequency (RF) signal. The RF contacts 210 may transmit a very high-frequency RF signal. The RF contacts 210 may be supported by the insulating part 240. The RF contacts 210 may be coupled to the insulating part 240 through an assembly process. The RF contacts 210 may be integrally molded with the insulating part 240 through injection molding.

Referring to FIGS. 2 to 5, the RF contacts 210 may be disposed to be spaced apart from each other. The RF contacts 210 may be electrically connected to the first board by being mounted on the first board. The RF contacts 210 may be electrically connected to the second board on which the counterpart connector is mounted by being connected to the RF contacts of the counterpart connector. Accordingly, the first board and the second board may be electrically connected. When the board connector 200 according to the first example is a receptacle connector, the counterpart connector may be a plug connector. When the board connector 200 according to the first example is a plug connector, the counterpart connector may be a receptacle connector.

A first RF contact 211 of the RF contacts 210 and a second RF contact 212 of the RF contacts 210 may be spaced apart from each other in a first axial direction (X-axis direction). The first RF contact 211 and the second RF contact 212 may be supported by the insulating part 240 at positions which are spaced apart from each other in the first axial direction (X-axis direction).

A first RF contact 211 of the RF contacts 210 and a second RF contact 212 of the RF contacts 210 may be spaced apart from each other along a second axial direction (Y-axis direction) which is perpendicular to the first axial direction (X-axis direction). The first RF contact 211 and the second RF contact 212 may be supported by the insulating part 240 at positions which are spaced apart from each other in the second axial direction (Y-axis direction). In this case, the first ground contact may include a first shielding member for shielding between the first RF contact and the transmission contacts with respect to the first axial direction, and additionally shielding between the first RF contact and the transmission contacts with respect to the second axial direction which is perpendicular to the first axial direction. Accordingly, in order to reduce the RF signal interference between the first RF contact 211 and the second RF contact 212, the transmission contacts 220 may be disposed in a space in which the first contact 211 and the second RF contact 212 are spaced apart. Therefore, the board connector 200 according to the first example may not only reduce RF signal interference by increasing the distance in which the first RF contact 211 and the second RF contact 212 are spaced apart from each other, but also it is possible to improve space utilization of the insulating part 240 by disposing the transmission contacts 220 in the space which is spaced apart therefor. The first RF contact 211 and the second RF contact 212 are disposed to be spaced apart from each other in both of the first axial direction (X-axis direction) and the second axial direction (Y-axis direction) such that the first RF contact 211 and the second RF contact 212 may be positioned in diagonal directions to each other. In this case, the distance between the RF contacts 210 may be secured compared to a case where the first RF contact 211 and the second RF contact 212 are arranged on a straight line. Accordingly, the size of the board connector 200 according to the first example may be implemented to be reduced while reducing the possibility of occurrence of RF signal interference between the RF contacts 210. The first RF contact 211 and the second RF contact 212 are spaced apart from each other with respect to the first axial direction (X-axis direction), and are additionally spaced apart from each other with respect to the second axial direction (Y-axis direction) which is perpendicular to the first axial direction (X-axis direction) so as to be disposed at non-opposite positions. In this case, the first RF contact 211 and the second RF contact 212 are spaced apart from each other with respect to the first axial direction (X-axis direction), and are additionally spaced apart from each other with respect to the second axial direction (Y-axis direction) so as to be disposed at asymmetrical positions.

The first RF contact 211 may include a first RF mounting member 2111. The first RF mounting member 2111 may be mounted on the first board. Accordingly, the first RF contact 211 may be electrically connected to the first board through the first RF mounting member 2111. The first RF contact 211 may be formed of a material having electrical conductivity. For example, the first RF contact 211 may be formed of a metal. The first RF contact 211 may be connected to any one of the RF contacts of the counterpart connector.

The second RF contact 212 may include a second RF mounting member 2121. The second RF mounting member 2121 may be mounted on the first board. Accordingly, the second RF contact 212 may be electrically connected to the first board through the second RF mounting member 2121. The second RF contact 212 may be formed of a material having electrical conductivity. For example, the second RF contact 212 may be formed of a metal. The second RF contact 212 may be connected to any one of the RF contacts of the counterpart connector.

Referring to FIGS. 2 to 5, the transmission contacts 220 are coupled to the insulating part 240. The transmission contacts 220 may be in charge of transmitting a signal, data, power and the like. The transmission contacts 220 may be coupled to the insulating part 240 through an assembly process. The transmission contacts 220 may be integrally molded with the insulating part 240 through injection molding.

The transmission contacts 220 may be disposed to be spaced apart from each other. The transmission contacts 220 may be electrically connected to the first board by being mounted on the first board. In this case, the transmission mounting member 2201 of each of the transmission contacts 220 may be mounted on the first board. The transmission contacts 220 may be formed of a material having electrical conductivity. For example, the transmission contacts 220 may be formed of metal. The transmission contacts 220 may be electrically connected to the second board on which the counterpart connector is mounted by being connected to the transmission contacts of the counterpart connector. Accordingly, the first board and the second board may be electrically connected.

Referring to FIGS. 2 to 5, the transmission contacts 220 may include first transmission contacts 221 and second transmission contacts 222.

The first transmission contacts 221 may be disposed to be spaced apart from the second RF contact 212 with respect to the first axial direction (X-axis direction). The second transmission contacts 222 may be disposed to be spaced apart from the first RF contact 211 with respect to the first axial direction (X-axis direction). The first transmission contacts 221 and the second transmission contacts 222 may be disposed to be spaced apart from each other along the second axial direction (Y-axis direction). In this case, a portion of the first transmission contacts 221 and a portion of the second transmission contacts 222 may be arranged to partially overlap each other with respect to the second axial direction (Y-axis direction). For example, a portion of the first transmission contacts 221 and a portion of the second transmission contacts 222 may be disposed to face each other at positions which area spaced apart from each other with respect to the second axial direction (Y-axis direction).

The first transmission contacts 221 may be disposed to be spaced apart from each other along the first axial direction (X-axis direction). The second transmission contacts 322 may be disposed to be spaced apart from each other along the first axial direction (X-axis direction).

The first transmission contacts 221 may include a 1-1 transmission contact 221_a_, a 1-2 transmission contact 221_b_ and a 1-3 transmission contact 221_c_.

The 1-1 transmission contact 221_a_, the 1-2 transmission contact 221_b_ and the 1-3 transmission contact 221_c_ may be disposed to be spaced apart from the second RF contacts 212 with respect to the first axial direction (X-axis direction). In this case, the 1-1 transmission contact 221_a_ may be disposed to be spaced apart from the second RF contact 212 by the furthest distance from the first axial direction (X-axis direction). The 1-2 transmission contact 221_b_ may be disposed to be spaced apart by a shorter distance than the distance in which the 1-1 transmission contact 221_b_ is spaced apart from the second RF contact 212 with respect to the first axial direction (X-axis direction). The 1-3 transmission contact 221_c_ may be disposed to be spaced apart by a shorter distance than the distance in which the 1-2 transmission contact 221_b_ is spaced apart from the second RF contact 212 with respect to the first axial direction (X-axis direction). The 1-2 transmission contact 221_b_ may be disposed between the 1-1 transmission contact 221_a_ and the 1-3 transmission contact 221_c_ with respect to the first axial direction (X-axis direction). The 1-3 transmission contact 221_c_ may be disposed between the 1-2 transmission contact 221_b_ and the second RF contact 212 with respect to the first axial direction (X-axis direction).

In addition, at least one of the first transmission contacts 221 may be disposed to overlap the first RF contact 211 with respect to the second axial direction (Y-axis direction). In this case, the 1-1 transmission contact 221_a_ may be disposed to overlap the first RF contact 211 with respect to the second axial direction (Y-axis direction). For example, at least one of the first transmission contacts 221 may be disposed to be opposite to the first RF contact 211 with respect to the second axial direction (Y-axis direction). In this case, the 1-1 transmission contact 221_a_ may be disposed to be opposite to the first RF contact 211 with respect to the second axial direction (Y-axis direction). Accordingly, the board connector 200 according to the first example may be implemented to be miniaturized in size along the first axial direction (X-axis direction).

The second transmission contacts 222 may include a 2-1 transmission contact 222_a_, a 2-2 transmission contact 222_b_ and a 2-3 transmission contact 222_c_.

The 2-1 transmission contact 222_a_, the 2-2 transmission contact 222_b_ and the 2-3 transmission contact 222_c_ may be disposed to be spaced apart from the first RF contact 211 with respect to the first axial direction (X-axis direction). In this case, the 2-1 transmission contact 222_a_ may be disposed to be spaced apart from the first RF contact 211 at the furthest distance with respect to the first axial direction (X-axis direction). The 2-2 transmission contact 222_b_ may be disposed to be spaced apart by a shorter distance than the distance in which the 2-1 transmission contact 222_a_ is spaced apart from the first RF contact 211 with respect to the first axial direction (X-axis direction). The 2-3 transmission contact 222_c_ may be disposed to be spaced apart by a shorter distance than the distance in which the 2-2 transmission contact 222_b_ is spaced apart from the first RF contact 211 with respect to the first axial direction (X-axis direction). The 2-2 transmission contact 222_b_ may be disposed between the 2-1 transmission contact 222_a_ and the 2-3 transmission contact 222_c_ with respect to the first axial direction (X-axis direction). The 2-3 transmission contact 222_c_ may be disposed between the 2-2 transmission contact 222_b_ and the first RF contact 211 with respect to the first axial direction (X-axis direction).

In addition, at least one of the second transmission contacts 222 may be disposed to overlap the second RF contact 212 with respect to the second axial direction (Y-axis direction). In this case, the 2-1 transmission contact 222_a_ may be disposed to overlap the second RF contact 212 with respect to the second axial direction (Y-axis direction). For example, at least one of the second transmission contacts 222 may be disposed to be opposite to the second RF contact 212 with respect to the second axial direction (Y-axis direction). In this case, the 2-1 transmission contact 222_a_ may be disposed to be opposite to the second RF contact 212 with respect to the second axial direction (Y-axis direction). Accordingly, the board connector 200 according to the first example may be implemented to be miniaturized in size along the first axial direction (X-axis direction).

Meanwhile, at least one of the first transmission contacts 221 may overlap at least one of the second transmission contacts 222 in the second axial direction (Y-axis direction). In this case, the 1-3 transmission contact 221_c_ and the 2-3 transmission contact 222_c_ may be disposed to overlap each other along the second axial direction (Y-axis direction). For example, at least one of the first transmission contacts 221 may be opposite to at least one of the second transmission contacts 222 in the second axial direction (Y-axis direction). In this case, the 1-3 transmission contact 221_c_ and the 2-3 transmission contact 222_c_ may be disposed to be opposite to each other along the second axial direction (Y-axis direction). That is, at least one of the first transmission contacts 221 may be disposed so as not to overlap at least one of the second transmission contacts 222 along the second axial direction (Y-axis direction). For example, at least one of the first transmission contacts 221 may be disposed not to be opposite to each other along the second axial direction (Y-axis direction) with at least one of the second transmission contacts 222. Therefore, the board connector 200 according to the first example may not only reduce RF signal interference by increasing the distance in which the first RF contact 211 and the second RF contact 212 are spaced apart from each other, but also it is possible to improve space utilization of the insulating part 240 by disposing the transmission contacts 220 in the spaced-apart space.

Meanwhile, in FIGS. 2 to 5, the board connector 200 according to the first example is illustrated to include 3 first transmission contacts 221 which are implemented as a 1-1 transmission contact 221_a_, a 1-2 transmission contact 221_b_ and a 1-3 transmission contact 221_c_ and 3 second transmission contacts 222 which are implemented as a 2-1 transmission contact 222_a_, a 2-2 transmission contact 222_b_ and a 2-3 transmission contact 222_c_, but is not limited thereto, and the board connector according to the first example may include 4 or more first transmission contacts 221, and second transmission contacts 222, respectively.

Referring to FIGS. 2 to 5, the ground housing 230 is coupled to the insulating part 240. The ground housing 230 may be grounded by being mounted on the first board. Accordingly, the ground housing 230 may implement a shielding function for signals, electromagnetic waves and the like for the RF contacts 210. In this case, the ground housing 230 may prevent electromagnetic waves generated from the RF contacts 210 from interfering with signals of circuit components located in the vicinity of the electronic device, and it is possible to prevent electromagnetic waves generated from the circuit components located in the vicinity of the electronic device from interfering with the RF signals transmitted by the RF contacts 210. Accordingly, the board connector 200 according to the first example may contribute to improving the EMI (Electro Magnetic Interference) shielding performance and EMC (Electro Magnetic Compatibility) performance by using the ground housing 230. The ground housing 230 may be formed of a material having electrical conductivity. For example, the ground housing 230 may be formed of a metal.

The ground housing 230 may be disposed to surround the sides of an inner space 230*a*. A portion of the insulating part 240 may be positioned in the inner space 230*a*. All of the first RF contact 211, the second RF contact 212 and the transmission contact 220 may be located in the inner space 230*a*. In this case, all of the first RF mounting member 2111, the second RF mounting member 2121 and the transmission mounting member 2201 may also be positioned in the inner space 230*a*. Accordingly, the ground housing 230 may implement a shielding wall for all of the first RF contact 211 and the second RF contact 212, and thus, it is possible to realize complete shielding by strengthening the shielding function for the first RF contact 211 and the second RF contact 212. The counterpart connector may be inserted into the inner space 230*a*.

The ground housing 230 may be disposed to surround all sides with respect to the inner space 230*a*. The inner space 230*a* may be disposed inside the ground housing 230. When the ground housing 230 is formed in a rectangular ring shape as a whole, the inner space 230*a* may be formed in a rectangular parallelepiped shape. In this case, the ground housing 230 may be disposed to surround four sides with respect to the inner space 230*a*.

The ground housing 230 may be integrally formed without a seam. The ground housing 230 may be integrally formed without a seam by the metal injection method such as the metal die casting method or the metal injection molding (MIM) method. The ground housing 230 may be integrally formed without a seam by CNC (Computer Numerical Control) machining, MCT (Machining Center Tool) machining or the like.

Referring to FIGS. 2 to 5, the insulating part 240 supports the RF contacts 210. The RF contacts 210 and the transmission contacts 220 may be coupled to the insulating part 240. The insulating part 240 may be formed of an insulating material. The insulating part 240 may be coupled to the ground housing 230 such that the RF contacts 210 are positioned in the inner space 230*a*.

Referring to FIGS. 2 to 6, the board connector 200 according to the first example may include a first ground contact 250.

The first ground contact 250 is coupled to the insulating part 240. The first ground contact 250 may be grounded by being mounted on the first board. The first ground contact 250 may be coupled to the insulating part 240 through an assembly process. The first ground contact 250 may be integrally molded with the insulating part 240 through injection molding.

The first ground contact 250 may implement a shielding function for the first RF contact 211 together with the ground housing 230. In this case, the first ground contact 250 may be disposed between the first RF contact 211 and the transmission contacts 220 with respect to the first axial direction (X-axis direction). The first ground contact 250 may be formed of a material having electrical conductivity. For example, the first ground contact 250 may be formed of a metal. When the counterpart connector is inserted into the inner space 230*a*, the first ground contact 250 may be connected to a ground contact of the counterpart connector.

Referring to FIGS. 2 to 4, the board connector 200 according to the first example may include a second ground contact 260.

The second ground contact 260 is coupled to the insulating part 240. The second ground contact 260 may be grounded by being mounted on the first board. The second ground contact 260 may be coupled to the insulating part 240 through an assembly process. The second ground contact 260 may be integrally molded with the insulating part 240 through injection molding.

The second ground contact 260 may implement a shielding function for the second RF contact 212 together with the ground housing 230. The second ground contact 260 may be disposed between the transmission contacts 220 and the second RF contact 212 with respect to the first axial direction (X-axis direction). The second ground contact 260 may be formed of a material having electrical conductivity. For example, the second ground contact 260 may be formed of a metal. When the counterpart connector is inserted into the inner space 230*a*, the second ground contact 260 may be connected to a ground contact of the counterpart connector.

Referring to FIGS. 2 to 9, the first RF contact 211 and the second RF contact 212 may be disposed to be spaced apart from each other along the first axial direction (X-axis direction). In addition, the first RF contact 211 and the second RF contact 212 may be disposed to be spaced apart from each other along the second axial direction (Y-axis direction). With respect to the first axial direction (X-axis direction), the first RF contact 211 and the second transmission contact 222 may be disposed to be spaced apart. With respect to the first axial direction (X-axis direction), the second RF contact 212 and the first transmission contact 221 may be disposed to be spaced apart. In this case, the first ground contact 250 may shield between the first RF contact 211 and the first transmission contacts 221 with respect to the second axis direction (X-axis direction), and may shield between the first RF contact 211 and the second transmission contact 222 with respect to the first axial direction (X-axis direction). The second ground contact 260 may shield between the second RF contact 212 and the second transmission contact 222 along the second axial direction (Y-axis direction), and may shield between the second RF contact 212 and the first transmission contact 221 along the first axial direction (X-axis direction).

In the board connector 200 according to the first example, with respect the first axial direction (X-axis direction) and the second axial direction (Y-axis direction), the first RF contact 211 and the second RF contact 212 may be arranged to be asymmetrical to each other. In this case, the first ground contact 250 may secure a space in the board connector 200 while implementing a shielding function between the first RF contact 211 and the transmission contact 220. Accordingly, by disposing the transmission contacts 220 in the space, the size of the board connector 200 according to the first example may be reduced.

Referring to FIGS. 2 to 6, the first ground contact 250 may include the first shielding member 251.

The first shielding member 251 may be positioned between the first RF contact 211 and the 1-1 transmission contact 221*a* with respect to the second axial direction (Y-axis direction). Accordingly, the first RF contact 211 may shield between the first RF contact 211 and the 1-1 transmission contact 221*a* by using the first shielding member 251. Accordingly, the first ground contact 250 may use the first shielding member 251 to prevent signal interference between the first RF contact 211 and the 1-1 transmission contact 221*a*. The first shielding member 251 may be formed in a plate shape vertically disposed between the first RF contact 211 and the 1-1 transmission contact 221*a*.

The first ground contact 250 may include a first shielding protrusion 252.

The first shielding protrusion 252 protrudes from the first shielding member 251. The first shielding protrusion 252 may be connected to the insulating part 240. Accordingly, the first ground contact 250 is electrically connected to the insulating part 240 through the first shielding protrusion 252 such that it is possible to realize complete shielding by strengthening the shielding performance for the first RF contact 211 and the 1-1 transmission contact 221*a*. The first shielding protrusion 252 may be formed in a plate shape disposed in the vertical direction. The first shielding protrusion 252 may protrude to the outside of the insulating part 240 to be connected to the ground housing of the counterpart connector.

The first ground contact 250 may include the first ground connecting member 253 and a first ground mounting member 254.

The first ground connecting member 253 is coupled to each of the first shielding member 251 and the first ground mounting member 254. The first shielding member 251 and the first ground mounting member 254 may be connected to each other through the first ground connecting member 253. The first ground connecting member 253 may be connected to a ground contact of the counterpart connector. Accordingly, the first ground contact 250 may be electrically connected to the ground contact of the counterpart connector by being connected to the ground contact of the counterpart connector through the first ground connecting member 253. Therefore, between the first RF contact 211 and the 1-1 transmission contact 221*a* which are disposed to be spaced apart from each other along the second axial direction (Y-axis direction), as the first ground contact 250 is connected to the ground contact of the counterpart connector through the first ground connecting member 253, it may be shielded. The first shielding member 251 may be coupled to the first ground connecting member 253. The first shielding member 251 may protrude from the first ground connecting member 253 along the first axial direction (X-axis direction). In this case, the first shielding protrusion 252 may protrude from the first shielding member 251 along the first axial direction (X-axis direction).

The first ground mounting member 254 is mounted on the first board. The first ground mounting member 254 may be grounded by being mounted on the first board. Accordingly, the first ground contact 250 may be grounded to the first board through the first ground mounting member 254. The first ground mounting member 254 may protrude from the first ground connecting member 253 along the second axial direction (Y-axis direction). In this case, the first ground mounting member 254 may be disposed between the first RF contact 211 and the first transmission contacts 221 with respect to the first axial direction (X-axis direction). The first ground mounting member 254 may protrude from the first ground connecting member 253 to a length that can be connected to the ground housing 230 with respect to the second axial direction (Y-axis direction). In this case, the first ground mounting member 254 and the first shielding member 251 may protrude in different directions from the first ground connecting member 253, and may be connected to different sidewalls of the ground housing 230. Accordingly, in the board connector 200 according to the first example, the first ground contact 250 and the ground housing 230 surround all sides of the first RF contact 211 and are electrically connected to each other such that it is possible to realize complete shielding by further strengthening the shielding performance for the first RF contact 211. The first ground mounting member 254 may be formed in a plate shape arranged in a horizontal direction.

The first ground contact 250 may include a first ground protrusion 255.

The first ground protrusion 255 may protrude from the first shielding member 251. The first ground protrusion 255 may be mounted on the first board. Accordingly, since the board connector 200 according to the first example can increase the area in which the first ground contact 250 is mounted on the first board, it is possible to further strengthen the shielding performance by using the first ground contact 250. The first ground protrusion 255 may be mounted on the first board by penetrating through the insulating part 240 and protruding from the insulating part 240. The first ground protrusion 255 may be mounted on the board at positions where the first ground mounting members 254 are spaced apart from each other. The first ground protrusion 255 may protrude from the first shielding member 251 in the vertical direction. The first ground protrusion 255 may be formed in a plate shape disposed in the vertical direction.

Figure 7:
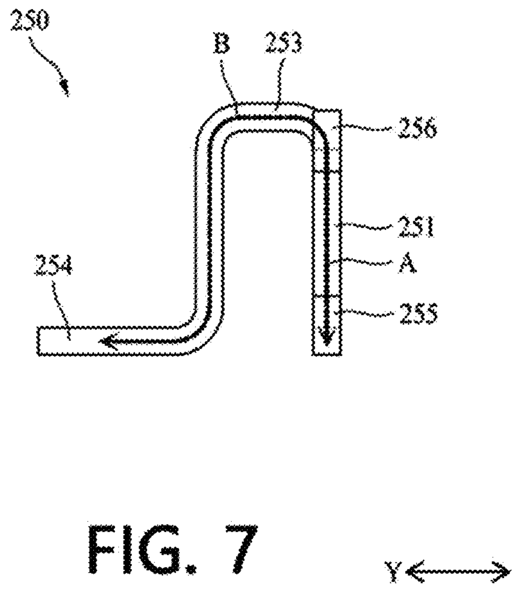
FIG. 7 is a conceptual plan view for explaining a shielding distance in the board connector according to the first example.

Meanwhile, as illustrated in FIG. 7, the first ground protrusion 255 and the first ground protrusion 255 may be mounted at positions spaced apart from each other. Accordingly, since electromagnetic waves generated by the first shielding member 251 may be grounded through the first ground protrusion 255, it is possible to further strengthen the shielding performance by using the first ground contact 250. In this case, since the electromagnetic waves are grounded through the first ground protrusion 255 without detouring to the first ground mounting member 254, the shielding distance at which the electromagnetic waves are shielded may be shortened in the board connector according to the first example. Accordingly, in the board connector 200 according to the first example, the electromagnetic waves are rapidly grounded such that it is possible to improve the shielding performance of the board connector 200.

For example, as illustrated in FIG. 7, a path through which the electromagnetic waves generated from the first shielding member 251 area grounded to the board through the first ground protrusion 255 may be defined as a first path A. A path through which the electromagnetic wave generated from the first shielding member are grounded to the board through the first ground connecting member 253 and the first ground mounting member 254 may be defined as a second path B. When the first ground protrusion 255 is formed on the first shielding member 251 to be grounded on the board, the electromagnetic waves and the like may be dissipated by being grounded to the first board through the first path A which is relatively shorter than the second path B. Accordingly, since the electromagnetic waves are rapidly dissipated to the board, it is possible to further strengthen the shielding performance of the board connector 200 according to the first example while reliability may be secured.

The first ground contact 250 may include a first connection protrusion 256.

The first connection protrusion 256 protrudes from the first shielding member 251. The first connection protrusion 256 may be connected to a ground housing of the counterpart connector. Accordingly, in the board connector 200 according to the first example, since the connection area in which the first ground contact 250 is connected to the ground housing of the counterpart connector can be increased, it is possible to further strengthen the shielding performance by using the first ground contact 250. The first connection protrusion 256 may pass through the insulating part 240 and protrude from the insulating part 240 to be connected to a ground housing of the counterpart connector. The first connection protrusion 256 may be inserted into the insulating part of the counterpart connector to be connected to the ground housing of the counterpart connector. In this case, a through hole into which the first connecting protrusion 256 is inserted may be formed in the insulating part of the counterpart connector. The first connecting protrusion 256 may protrude from the first shielding member 251 in the vertical direction. With respect to the vertical direction, the first connection protrusion 256 and the first ground protrusion 255 may protrude from the first shielding member 251 in opposite directions. The first connection protrusion 256 may be formed in a plate shape disposed in the vertical direction.

In this way, the board connector 200 according to the first example may use the first ground contact 250 and the ground housing 230 to implement a first ground loop 250*a* (illustrated in FIG. 5) for the first RF contact 211. Therefore, by further strengthening the shielding performance for the RF contact 11 by using the first ground loop, the board connector 200 according to the first example may realize completely shielding for the RF contact 211.

The second ground contact 260 may include at least one of a second shielding member 261, a second shielding protrusion 262, a second ground connecting member 263, a second ground mounting member 264, a second ground protrusion 265 and a second connection protrusion 266. In this case, since the second shielding member 261, the second shielding protrusion 262, the second ground connecting member 263, the second ground mounting member 264, the second ground protrusion 265 and the second connection protrusion 266 may be implemented to substantially coincide with the first shielding member 251, the first shielding protrusion 252, the first ground connecting member 253, the first ground mounting member 254, the first ground protrusion 255 and the first connection protrusions 256, respectively, the detailed descriptions thereof will be omitted.

Figure 5:
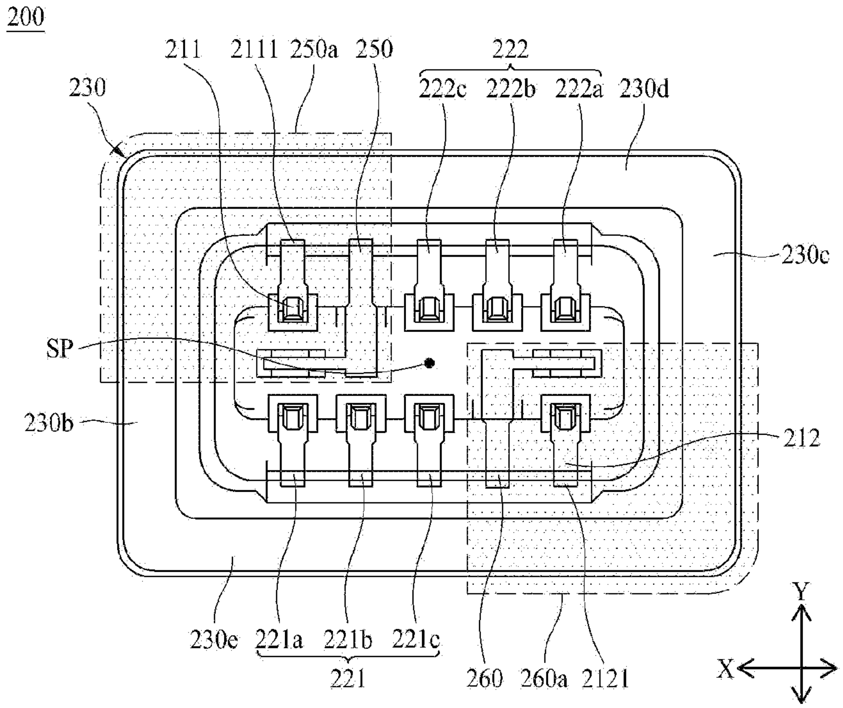
FIG. 5 is a conceptual plan view for explaining a ground loop in the board connector according to the first example.
Figure 6:
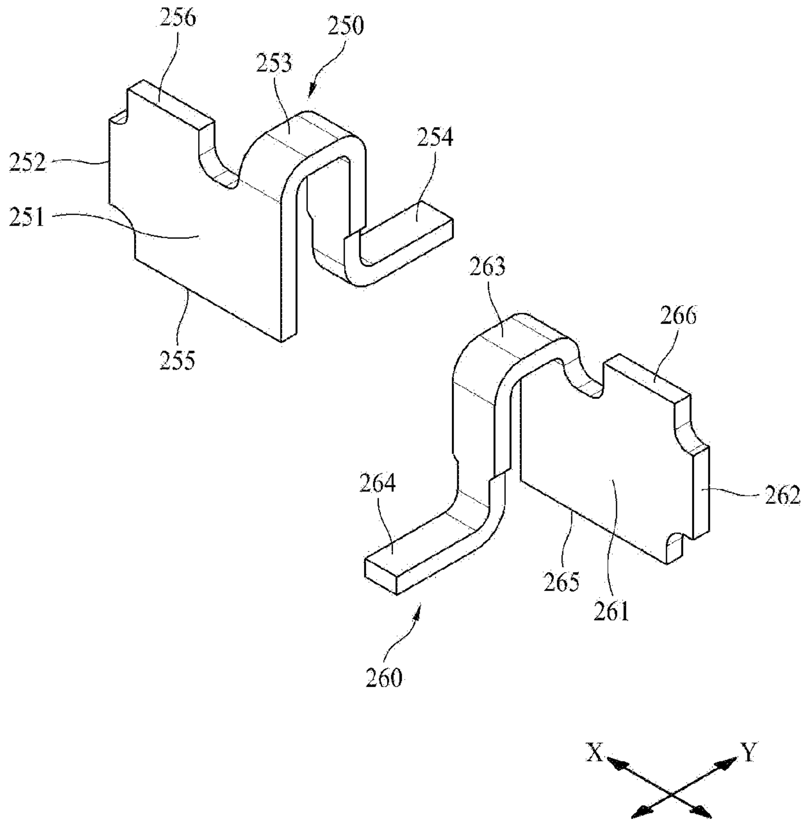
FIG. 6 is a schematic perspective view of a first grounding contact and a second grounding contact in the board connector according to the first example.

The second ground contact 260 and the first ground contact 250 may be formed in the same shape as each other. Accordingly, the board connector 200 according to the first example may improve the ease of the manufacturing operation of manufacturing each of the second ground contact 260 and the first ground contact 250. In this case, as illustrated in FIG. 5, the second ground contact 260 and the first ground contact 250 may be arranged to be point-symmetric with respect to a symmetry point SP. The symmetry point SP is a point which is spaced apart from each other by the same distance from each of both sidewalls 230*b*, 230*c* of the ground housing 230 that are disposed to be spaced apart from each other with respect to the first axial direction (X-axis direction), and is additionally spaced apart from each other by the same distance each of both sidewalls 230*d*, 230*e* of the ground housing 230 that are disposed to be spaced apart from each other with respect to the second axial direction (Y-axis direction). Therefore, since the board connector 200 according to the first example is implemented such the second ground contact 260 and the first ground contact 250 are formed in the same shape with only different arrangement directions, it is possible to further improve the ease of manufacturing operations for manufacturing the second ground contact 260 and the first ground contact 250. In this case, the second RF contact 212 and the first RF contact 211 may be arranged to be point-symmetric with respect to the symmetry point SP.

Meanwhile, as illustrated in FIG. 5, the second shielding member 261 and the first shielding member 251 may be disposed on the same line. In this case, the second shielding member 261 may be disposed to overlap the first shielding member 251 along the first axial direction (X-axis direction). The second shielding member 261 may be disposed to be opposite to the first shielding member 251 along the first axial direction (X-axis direction). Accordingly, while the board connector 200 according to the first example may implement a shielding force between the first RF contact 211 and the first transmission contact 221 and a shielding force between the second RF contact 212 and the second transmission contacts 222, it is possible to realize miniaturization by reducing the overall size with respect to the first axial direction (X-axis direction).

Referring to FIGS. 2 to 9, in the board connector 200 according to the first example, the ground housing 230 may be implemented as follows.

The ground housing 230 may include a ground inner wall 231, a ground outer wall 232 and a ground connection wall 233.

The ground inner wall 231 faces the insulating part 240. The ground inner wall 231 may be disposed to face the inner space 230*a*. The first ground contact 250 and the second ground contact 260 may be respectively connected to the ground inner wall 231. The ground inner wall 231 may be disposed to surround all sides with respect to the inner space 230*a*. Although not illustrated, the ground inner wall 231 may include a plurality of sub ground inner walls, and the sub ground inner walls may be arranged on different sides with respect to the inner space 230*a*.

Figure 9:
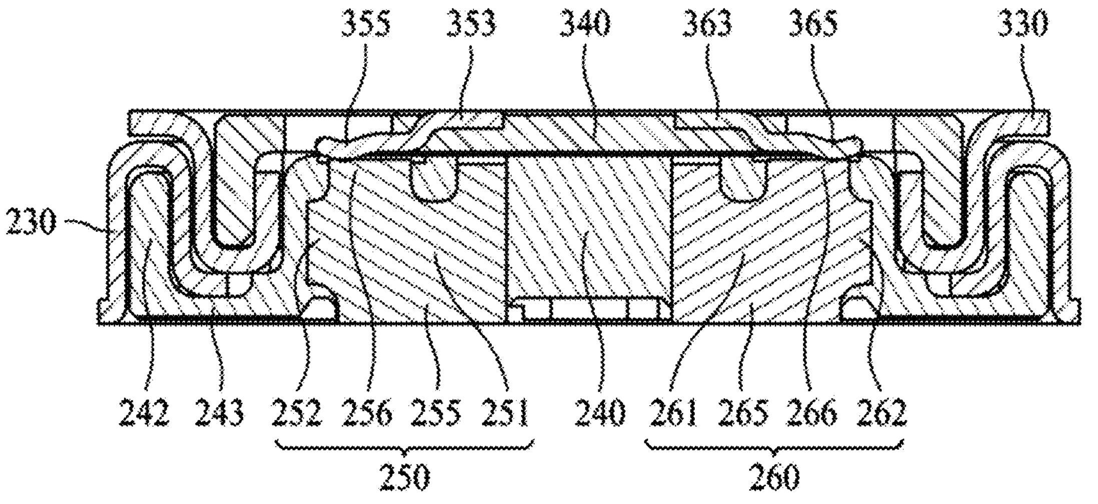
FIG. 9 is a schematic side cross-sectional view showing a state where the board connector according to the first example and the board connector according to the second example are combined on the basis of the line I-I in FIG. 8.

The ground inner wall 231 may be connected to a ground housing of a counterpart connector inserted into the inner space 230*a*. For example, as illustrated in FIG. 9, the ground inner wall 231 may be connected to the ground housing 330 of the counterpart connector. In this way, the board connector 200 according to the first example may further strengthen a shielding function through the connection between the ground housing 230 and the ground housing of the counterpart connector. In addition, the board connector 200 according to the first example may reduce electrical adverse effects such as crosstalk or the like that may be generated by mutual capacitance or induction between adjacent terminals through the connection between the ground housing 230 and the ground housing of the counterpart connector. In this case, since the board connector 200 according to the first example may secure a path through which electromagnetic waves are introduced into at least one ground of the first and second boards, it is possible to further strengthen the EMI shielding performance.

The ground outer wall 232 is spaced apart from the ground inner wall 231. The ground outer wall 232 may be disposed outside the ground inner wall 231. The ground outer wall 232 may be disposed to surround all sides with respect to the ground inner wall 231. The ground outer wall 232 and the ground inner wall 231 may be implemented as double shielding walls surrounding the sides of the inner space 230*a*. The first RF contact 211 and the second RF contact 212 may be positioned in the inner space 230*a* surrounded by the shielding walls. Accordingly, the ground housing 230 may implement a shielding function for the RF contacts 210 by using a shielding wall. Accordingly, the board connector 200 according to the first example may contribute to further improving the EMI shielding performance and EMC performance by using the shielding wall.

The ground outer wall 232 may be grounded by being mounted on the first board. In this case, the ground housing

230 may be grounded through the ground outer wall 232. When one end of the ground outer wall 232 is coupled to the ground connection wall 233, the other end of the ground outer wall 232 may be mounted on the first board. In this case, the ground outer wall 232 may be formed to have a higher height than the ground inner wall 231.

The ground connection wall 233 is coupled to each of the ground inner wall 231 and the ground outer wall 232. The ground connection wall 233 may be disposed between the ground inner wall 231 and the ground outer wall 232. The ground inner wall 231 and the ground outer wall 232 may be electrically connected to each other through the ground connection wall 233. Accordingly, when the ground outer wall 232 is mounted on the first board and grounded, the ground connection wall 233 and the ground inner wall 231 are also grounded to implement a shielding function.

The ground connection wall 233 may be coupled to one end of the ground outer wall 232 and one end of the ground inner wall 231, respectively. Based on FIG. 9, one end of the grounded outer wall 232 may correspond to the upper end of the grounded outer wall 232, and one end of the grounded inner wall 231 may correspond to the upper end of the grounded inner wall 231. The ground connection wall 233 may be formed in a plate shape disposed in a horizontal direction, and the ground outer wall 232 and the ground inner wall 231 may be formed in plate shapes which are disposed in a vertical direction, respectively. The ground connection wall 233, the ground outer wall 232 and the ground inner wall 231 may be integrally formed.

The ground connection wall 233 may be connected to a ground housing of a counterpart connector inserted into the inner space 230*a*. Accordingly, in the board connector 200 according to the first example, since the ground outer wall 232 and the ground connection wall 233 are connected to the ground housing of the counterpart connector, it is possible to further strengthen the shielding function by increasing the contact area between the ground housing 230 and the ground housing of the counterpart connector.

The ground floor 234 protrudes from the lower end of the ground inner wall 231 toward the inner space 230*a*. That is, the ground floor 234 may protrude to the inside of the ground inner wall 231. The ground floor 234 may extend along the lower end of the ground inner wall 231 to be formed in a closed ring shape. The ground floor 234 may be grounded by being mounted on the first board. In this case, the ground housing 330 may be grounded through the ground floor 234. When the counterpart connector is inserted into the inner space 230*a*, the ground floor 234 may be connected to a ground housing of the counterpart connector. The ground floor 234 may be formed in a plate shape disposed in the horizontal direction.

Herein, the ground housing 230 may implement a shielding function for the first RF contact 211 together with the first ground contact 250. The ground housing 230 may implement a shielding function for the second RF contact 212 together with the second ground contact 260.

In this case, as illustrated in FIG. 5, the ground housing 230 may include a first shielding wall 230*b*, a second shielding wall 230*c*, a third shielding wall 230*d* and a fourth shielding wall 230*e*. The first shielding wall 230*b*, the second shielding wall 230*c*, the third shielding wall 230*d* and the fourth shielding wall 230*e* may be implemented by the ground inner wall 231, the ground outer wall 232 and the ground connection wall 233, respectively. The first shielding wall 230*b* and the second shielding wall 230*c* are disposed to be opposite to each other with respect to the first axial direction (X-axis direction). The first RF contact 211 and the second RF contact 212 may be positioned between the first shielding wall 230*b* and the second shielding wall 230*c* with respect to the first axial direction (X-axis direction). With respect to the first axial direction (X-axis direction), the first RF contact 211 may be located at a position where the distance away from the first shielding wall 230*b* is shorter than the distance away from the second shielding wall 230*c*. With respect to the first axial direction (X-axis direction), the second RF contact 212 may be located at a position where the distance away from the second shielding wall 230*c* is shorter than the distance away from the first shielding wall 230*b*. The third shielding wall 230*d* and the fourth shielding wall 230*e* are disposed to be opposite to each other with respect to the second axial direction (Y-axis direction). The first RF contact 211 and the second RF contact 212 may be positioned between the third shielding wall 230*d* and the fourth shielding wall 230*e* with respect to the second axial direction (Y-axis direction).

The first ground contact 250 may be disposed between the second transmission contacts 222 with respect to the first axial direction (X-axis direction). Accordingly, the first RF contact 211 may be positioned between the first shielding wall 230*b* and the first ground connecting member 253 of the first ground contact 250 with respect to the first axial direction (X-axis direction), and may be positioned between the third shielding wall 230*b* and the first shielding member 251 of the first ground contact 250 with respect to the second axial direction (Y-axis direction). Accordingly, the board connector 200 according to the first example may use the first ground contact 250, the first shielding wall 230*b* and the third shielding wall 230*d* to strengthen the shielding function for the first RF contact 211. The first ground contact 250, the first shielding wall 230*b* and the third shielding wall 230*d* may implement a shielding force for RF signals by being disposed on four sides with respect to the first RF contact 211. In this case, the first ground contact 250, the first shielding wall 230*b* and the third shielding wall 230*d* may implement the first ground loop 250*a* (illustrated in FIG. 5) for the first RF contact 211. Therefore, by further strengthening the shielding function for the first RF contact 211 by using the first ground loop 250*a*, the board connector 200 according to the first example may realize complete shielding for the first RF contact 211.

The second ground contact 260 may be disposed between the second RF contact 212 and the first transmission contacts 221 with respect to the first axial direction (X-axis direction). Accordingly, the second RF contact 212 may be positioned between the second shielding wall 230*c* and the second ground connecting member 263 of the second ground contact 260 with respect to the first axial direction (X-axis direction), and may be positioned between the fourth shielding wall 230*e* and the second shielding member 261 of the second ground contact 260 with respect to the second axial direction (Y-axis direction). Accordingly, the board connector 200 according to the first example strengthen a shielding function for the second RF contact 212 by using the second ground contact 260, the second shielding wall 230*c* and the fourth shielding wall 230*e*. The second ground contact 260, the second shielding wall 230*c* and the fourth shielding wall 230*e* may implement a shielding force for RF signals by being disposed on four sides with respect to the second RF contact 212. In this case, the second ground contact 260, the second shielding wall 230*c* and the fourth shielding wall 230*e* may implement the second ground loop 260*a* (illustrated in FIG. 5) for the second RF contact 212. Therefore, by further strengthening the shielding function for the second RF contact 212 by using the second ground loop 260*a*, the board connector 200 according to the first example may realize complete shielding for the second RF contact 212.

Referring to FIGS. 2 to 9, in the board connector 200 according to the first example, the insulating part 240 may be implemented as follows.

The insulating part 240 may include an insulating member 241, an insertion member 242 and a connecting member 243.

The insulating member 241 supports the RF contacts 210 and the transmission contacts 220. The insulating member 241 may be positioned in the inner space 230*a*. The insulating member 241 may be positioned inside the ground inner wall 231. The insulating member 241 may be inserted into an inner space of the counterpart connector.

The insertion member 242 is inserted between the ground inner wall 231 and the ground outer wall 232. As the insertion member 242 is inserted between the ground inner wall 231 and the ground outer wall 232, the insulating part 240 may be coupled to the ground housing 230. The insertion member 242 may be inserted between the ground inner wall 231 and the ground outer wall 232 by the interference fit method. The insertion member 242 may be disposed outside the insulating member 241. The insertion member 242 may be disposed to surround the outside of the insulating member 241.

The connecting member 243 is coupled to each of the insertion member 242 and the insulating member 241. The insertion member 242 and the insulating member 241 may be connected to each other through the connecting member 243. With respect to the vertical direction, the connecting member 243 may be formed to have a thinner thickness than those of the inserting member 242 and the insulating member 241. Accordingly, a space is provided between the insertion member 242 and the insulating member 241, and the counterpart connector may be inserted into the space. The connecting member 243, the inserting member 242 and the connecting member 243 may be integrally formed.

The insulating part 240 may include a soldering inspection window 244 (illustrated in FIG. 8).

The soldering inspection window 244 may be formed through the insulating part 240. The soldering inspection window 244 may be used to inspect a state where the RF mounting members 2111, 2121 are mounted on the first board. In this case, the RF contacts 210 may be coupled to the insulating part 240 such that the RF mounting members 2111, 2121 are positioned on the soldering inspection window 244. Accordingly, the RF mounting members 2111, 2121 are not covered by the insulating part 240. Therefore, in a state where the board connector 200 according to the first example is mounted on the first board, the operator may inspect the mounted state of the RF mounting members 2111, 2121 on the first board through the soldering inspection window 244. Accordingly, in the board connector 200 according to the first example, even if all of the RF contacts 210 including the RF mounting members 2111, 2121 are positioned inside the ground housing 230, it is possible to improve the accuracy of the mounting operation of mounting the RF contacts 210 on the first board. The soldering inspection window 244 may be formed to pass through the insulating member 241.

The insulating part 240 may include a plurality of the soldering inspection windows 244. In this case, the RF mounting members 2111, 2121 may be positioned in different soldering inspection windows 244. The transmission mounting members 2201 may be positioned in some of the soldering inspection windows 244. Therefore, in a state where the board connector 200 according to the first example is mounted on the first board, the operator may inspect the mounted state of the RF mounting members 2111, 2121 and the transmission mounting members 2201 on the first board through the soldering inspection windows 244. Accordingly, the board connector 200 according to the first example may improve the accuracy of the operation of mounting the RF mounting members 2111, 2121 and the transmission mounting members 2201 on the first board. The soldering inspection windows 244 may be formed to pass through the insulating part 240 at positions which are spaced apart from each other.

Board Connector 300 According to the Second Example

Figure 10:
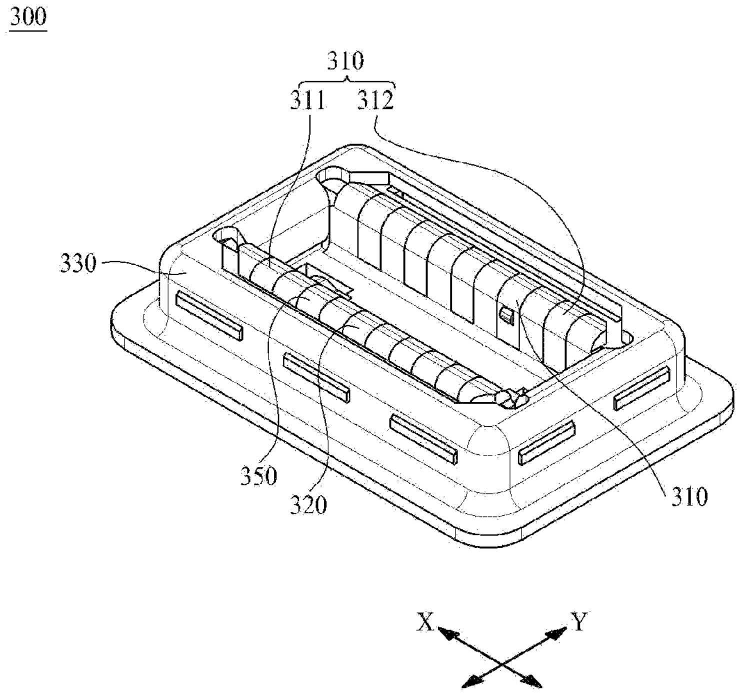
FIG. 10 is a schematic perspective view of a board connector according to the second example.
Figure 11:
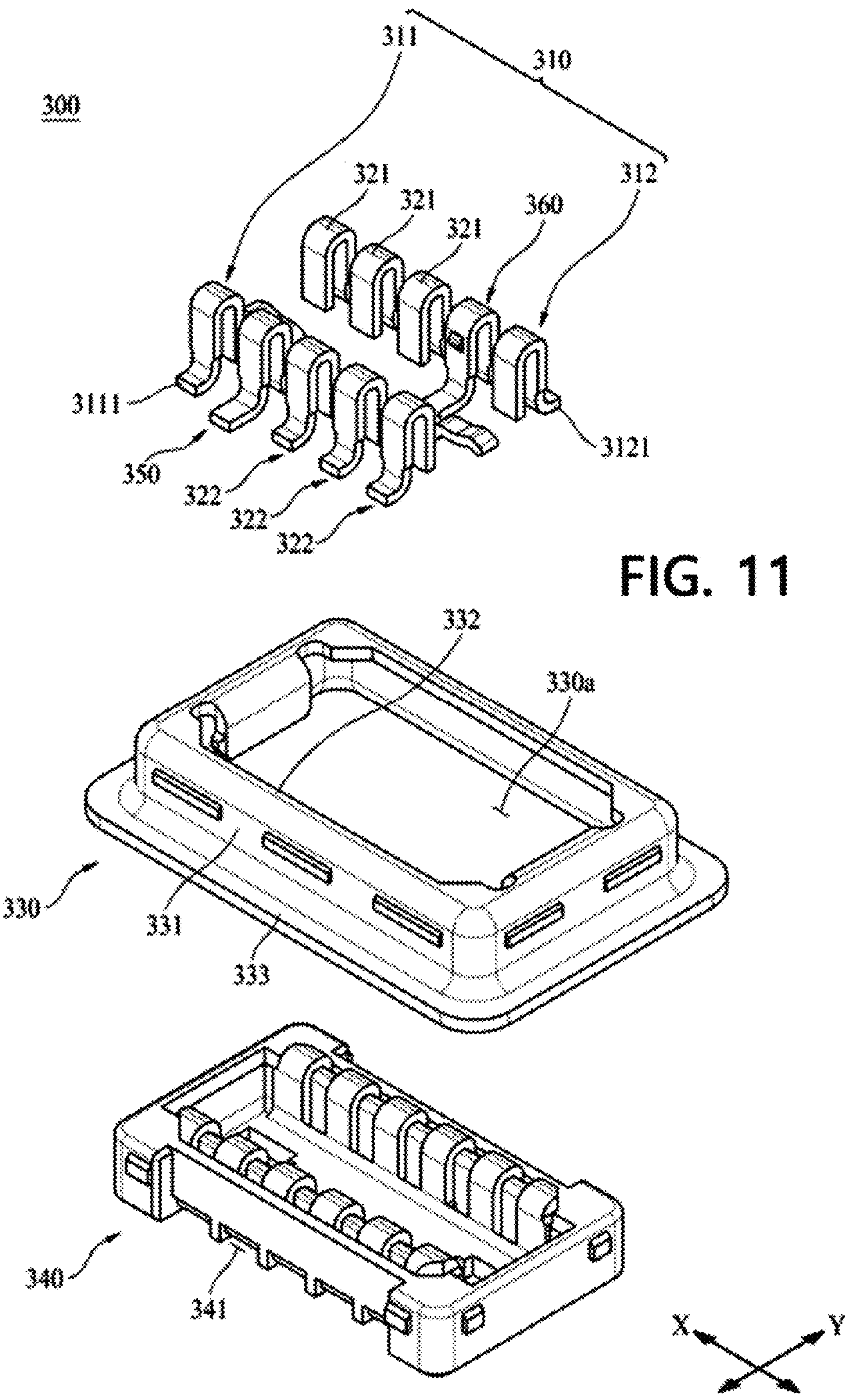
FIG. 11 is a schematic exploded perspective view of the board connector according to the second example.

Referring to FIGS. 2, 10 and 11, the board connector 300 according to the second example may be mounted on the second board. When the board connector 300 according to the second example and the counterpart connector are assembled to be coupled to each other, the second board on which the board connector 300 according to the second example is mounted and the first board on which the counterpart connector is mounted may be electrically connected. In this case, the counterpart connector may be implemented as the board connector 200 according to the first example. Meanwhile, the counterpart connector in the board connector 200 according to the first example may be implemented as the board connector 300 according to the second example.

The board connector 300 according to the second example may include a plurality of RF contacts 310, a plurality of transmission contacts 320, a ground housing 330 and an insulating part 340. Since the RF contacts 310, the transmission contacts 320, the ground housing 33 and the insulating part 340 may be implemented to substantially coincide with the RF contacts 210, the transmission contacts 220, the ground housing 230 and the insulating part 240, respectively, the following description will focus on differences.

A first RF contact 311 of the RF contacts 310 and a second RF contact 312 of the RF contacts 310 may be spaced apart from each other with respect to the first axial direction (X-axis direction), and additionally may be supported by the insulating part 340 at asymmetric positions which are spaced apart from each other with respect to the second axial direction (Y-axis direction). The first RF contact 311 may include a first RF mounting member 3111 for mounting on the second board. The second RF contact 312 may include a second RF mounting member 3121 for mounting on the second board.

Referring to FIG. 11, the transmission contacts 320 may include a first transmission contact 321 and a second transmission contact 322.

The first transmission contacts 321 may be disposed to be spaced apart from the second RF contact 312 with respect to the first axial direction (X-axis direction). The second transmission contacts 322 may be disposed to be spaced apart from the first RF contact 311 with respect to the first axial direction (X-axis direction). The first transmission contacts 321 and the second transmission contacts 322 may be disposed to be spaced apart from each other along the second axial direction (Y-axis direction). In this case, a portion of the first transmission contacts 321 and a portion of the second transmission contacts 322 may be arranged to partially overlap each other with respect to the second axial direction (Y-axis direction). For example, a portion of the first transmission contacts 321 and a portion of the second transmission contacts 322 may be disposed to be opposite to each other only partially with respect to the second axial direction (Y-axis direction). The first transmission contacts 321 may be disposed to be spaced apart from each other along the first axial direction (X-axis direction). The second transmission contacts 322 may be disposed to be spaced apart from each other along the first axial direction (X-axis direction).

Meanwhile, in FIG. 11, the board connector 300 according to the second example is illustrated as including 3 first transmission contacts 321 and second transmission contacts 322, respectively, but is not limited thereto, and the board connector 300 according to the second example may include 4 or more first transmission contacts 321 and second transmission contacts 322, respectively.

The ground housing 330 is coupled to the insulating part 340. The ground housing 330 may be grounded by being mounted on the second board. The ground housing 330 may be disposed to surround the sides of the inner space 330*a*. The insulating part 340 may be positioned in the inner space 330*a*. All of the first RF contact 311, the second RF contact 312 and the transmission contact 320 may be positioned in the inner space 330*a*. In this case, all of the first RF mounting member 3111, the second RF mounting member 3121 and the transmission mounting member 3201 may also be positioned in the inner space 330*a*. The counterpart connector may be inserted into the inner space 330*a*. In this case, a portion of the counterpart connector may be inserted into the inner space 330*a*, and a portion of the board connector 300 according to the second example may be inserted into the inner space of the counterpart connector. The ground housing 330 may be disposed to surround all sides with respect to the inner space 330*a*.

The insulating part 340 supports the RF contacts 310. The RF contacts 310 and the transmission contacts 320 may be coupled to the insulating part 340. The insulating part 340 may be coupled to the ground housing 330 such that the RF contacts 310 and the transmission contacts 320 are positioned in the inner space 330*a*.

Referring to FIGS. 9 to 16, the board connector 300 according to the second example may include a first ground contact 350 and a second ground contact 360. Since the first ground contact 350 and the second ground contact 360 may be implemented to substantially coincide with the first ground contact 250 and the second ground contact 260 in the board connector 200 according to the first example as described above, respectively, the following description will focus on differences.

The first ground contact 350 may implement a shielding function for the first RF contact 311 together with the ground housing 330. The first ground contact 350 may be disposed between the first RF contact 311 and the transmission contact 320 with respect to the first axial direction (X-axis direction). When the counterpart connector is inserted into the inner space 330*a*, the first ground contact 350 may be connected to a ground contact of the counterpart connector.

The second ground contact 360 may implement a shielding function for the second RF contact 312 together with the ground housing 330. The second ground contact 360 may be disposed between the transmission contacts 320 and the second RF contact 212 with respect to the first axial direction (X-axis direction). When the counterpart connector is inserted into the inner space 330*a*, the second ground contact 360 may be connected to a ground contact of the counterpart connector.

Referring to FIGS. 10 to 16, the first RF contact 311 and the second RF contact 312 may be disposed to be spaced apart from each other along the first axial direction (X-axis direction).

The first ground contact 350 may include a first ground mating member 351 and a first ground mounting member 352.

The first ground mating member 351 is to be connected to a ground contact of a counterpart connector. The first ground contact 350 may be electrically connected to the ground contact of the counterpart connector by being connected to the ground contact of the counterpart connector through the first ground mating member 351. Accordingly, the shielding force of the first ground contact 350 with respect to the first RF contact 311 may be strengthened. For example, the first ground mating member 351 may be connected to the first ground connecting member 253 of the first ground contact 250 of the board connector 200 according to the first example.

The first ground mating member 351 may be positioned between the first RF contact and the second transmission contacts 322 with respect to the first axial direction (X-axis direction). Accordingly, the first ground mating member 351 may shield between the first RF contact 311 and the transmission contacts 320 with respect to the first axial direction (X-axis direction). In this case, the first ground mating member 351 may be positioned between the first RF contact 311 and the 1-1 transmission contact 321*a* with respect to the first axial direction (X-axis direction). The first ground mating member 351 may be formed in a plate shape disposed in the vertical direction. In this case, the first ground mating member 351 may be implemented to be disposed in the vertical direction through bending processing for the plate material.

The first ground mounting member 352 is mounted on the second board. The first ground mounting member 352 may be grounded by being mounted on the second board. Accordingly, the first ground contact 350 may be grounded to the second board through the first ground mounting member 352. The first ground mounting member 352 may protrude from the first ground mating member 351 along the second axial direction (Y-axis direction). The first ground mounting member 352 may be formed in a plate shape disposed in the horizontal direction.

The first ground contact 350 may include a first ground connecting member 353.

The first ground connecting member 353 is coupled to the first ground mating member 351. The first ground connecting member 353 may protrude from the first ground mating member 351 along the second axial direction (Y-axis direction). The first ground connecting member 353 may be formed in a plate shape disposed in the horizontal direction.

Meanwhile, the first ground connecting member 353 is mounted on the second board. The first ground connecting member 353 may be grounded by being mounted on the second board. Accordingly, the first ground contact 350 may be grounded to the second board through the first ground mounting member 352.

The first ground contact 350 may include a first connection arm 354.

Figure 14:
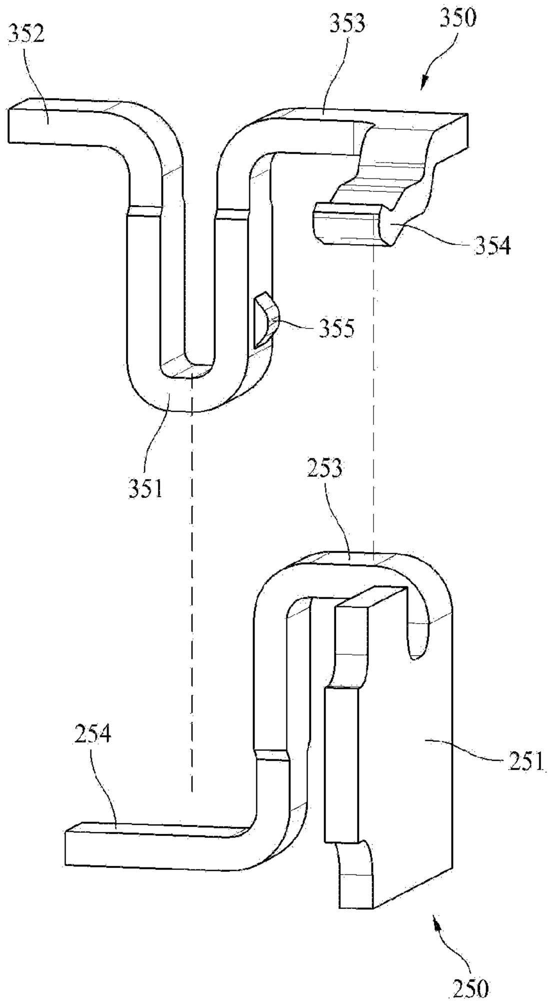
FIG. 14 is a schematic perspective view showing a state where the ground contact of the board connector according to the first example and the ground contact of the board connector according to the second example are disassembled.

The first connection arm 354 is to be connected to a ground contact of the counterpart connector. The first connection arm 354 may move elastically as it is connected to the ground contact of the counterpart connector. Accordingly, since the first ground contact 350 may be firmly maintained while being connected to the ground contact of the counterpart connector by using the elastic force or restoring force of the first connecting arm 354, it is possible to improve connection stability for a ground contact of the counterpart connector. Therefore, in the board connector 300 according to the second example, since the connection force to the counterpart connector may be strengthened by using the first connection arm 354, it is possible to further strengthen the shielding performance through the connection with the ground contact of the counterpart connector. For example, as illustrated in FIG. 14, the first connection arm 354 may be connected to the first shielding member 251 of the first ground contact 250 of the board connector 200 according to the first example. In this case, the first connection arm 354 may be pushed by the first shielding member 251 and elastically moved such that the first shielding member 251 can be pressed by using a restoring force.

Referring to FIGS. 13 to 16, the first connection arm 354 may be elastically and movably coupled to the first ground connecting member 353. As the first connection arm 354 is connected to the ground contact of the counterpart connector, the first connection arm 354 may be rotated with respect to a portion coupled to the first ground connecting member 353. In addition, the first connection arm 354 may protrude from the first ground connecting member 353 along the first axial direction (X-axis direction). In this case, an included angle between the first connection arm 354 and the first ground connecting member 353 may be coupled to the first ground connecting member 353 to form an obtuse angle. For example, the first connection arm 354 and the first ground connecting member 353 may be formed to extend in different directions. The first connection arm 354 may be formed in a plate shape disposed in the horizontal direction.

The first ground contact 350 may include the first connection protrusion 355.

The first connection protrusion 355 is connected to a ground contact of the board connector 200 according to the first example. The first connection protrusion 355 may protrude from the first ground mating member 351. The first connection protrusion 355 may be connected to a ground contact of the counterpart connector. In this case, the first connection protrusion 355 and the first connection arm 354 may be respectively connected to the ground contact of the counterpart connector at different positions. Accordingly, the first ground contact 350 is connected to the ground contact of the counterpart connector at a plurality of locations, thereby shortening the distance to the position where the electromagnetic wave or the like is grounded on the board. Accordingly, in the board connector 300 according to the second example, it is possible to further strengthen the shielding performance by allowing the electromagnetic waves or the like to be rapidly grounded through the first ground contact 350.

Figure 15:
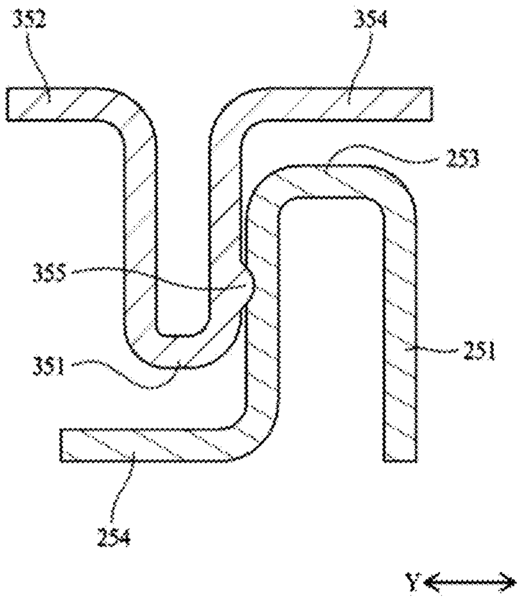
FIG. 15 is a schematic cross-sectional view showing a state where the ground contact of the board connector according to the first example and the ground contact of the board connector according to the second example are combined.
Figure 16:
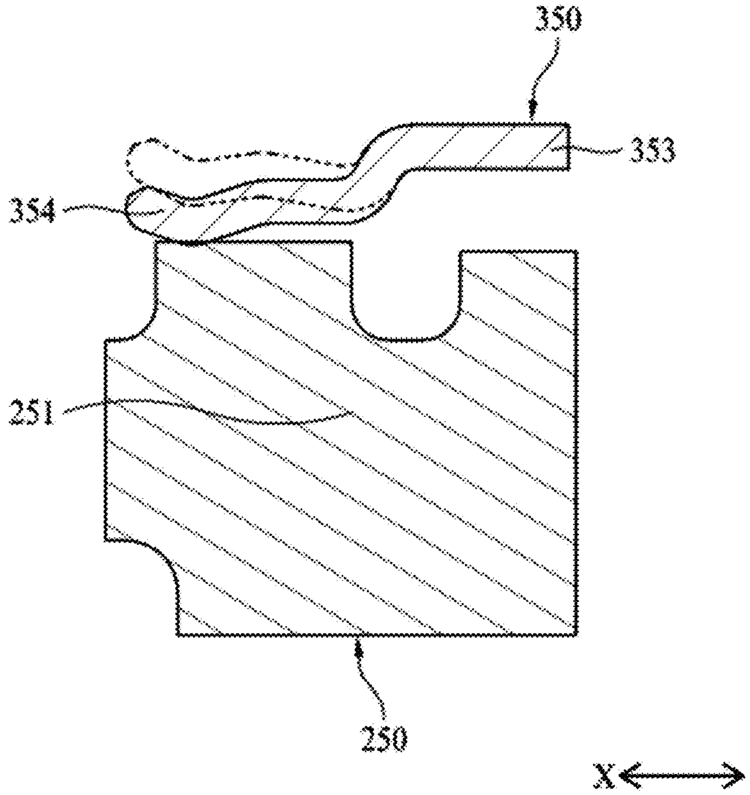
FIG. 16 is a schematic cross-sectional view showing a state where the first ground arm of the board connector according to the second example is connected to the first ground protrusion according to the first example.

For example, referring to FIGS. 14 to 16, the first connecting arm 354 of the first ground contact 350 may be connected to the first shielding member 251 of the first ground contact 250 of the board connector 200 according to the first example. The first connecting protrusion 355 of the first ground contact 350 may be connected to the first ground connecting member 253 of the first ground contact 250 of the board connector 200 according to the first example. In this case, the electromagnetic waves generated at the portion where the first connecting arm 354 and the first ground contact 250 are connected may be grounded in the shortest distance through the first ground connecting member 353 which is mounted on the second board. Electromagnetic waves generated at a portion where the first connection protrusion 355 and the first ground connecting member 253 are connected may be grounded by the shortest distance through the first ground mounting member 254 which is mounted on the first board. Accordingly, the board connector 1 may further strengthen the shielding performing by allowing the electromagnetic waves to be rapidly grounded through the first ground contact 250 of the board connector according to the first example and the first ground contact 350 of the board connector according to the second example.

In this way, the first connection arm 354 and the first connection protrusion 355 may be respectively connected to the ground contact of the counterpart connector at different positions. Accordingly, as the number of points connected to each other of the ground contacts 250 and 350 increases, the distance to which the electromagnetic waves are grounded may be realized as the shortest distance. Accordingly, in the board connector 1, since the electromagnetic waves or the like are rapidly grounded, it is possible to further strengthen the shielding performance.

In this way, the board connector 300 according to the second example may implement a first ground loop 350*a* (illustrated in FIG. 12) for the first RF contact 311 by using the first ground contact 350 and the ground housing 330. Therefore, by further strengthening the shielding performance for the first RF contact 311 by using the first ground loop 350*a*, the board connector 300 according to the second example may realize complete shielding.

The second ground contact 360 may include at least one of a second ground connecting member 361, a second ground mounting member 362, a second ground connecting member 363, a second connection arm 364 and a second connection protrusion 365. In this case, since the second ground connecting member 361, the second ground mounting member 362, the second ground connecting member 363, the second connection arm 364 and the second connection protrusion 365 may be implemented to substantially coincide with the first ground mating member 351, the first ground mounting member 352, the first ground connecting member 353, the first connection arm 354 and the first connection protrusion 355, the detailed descriptions thereof will be omitted.

Figure 12:
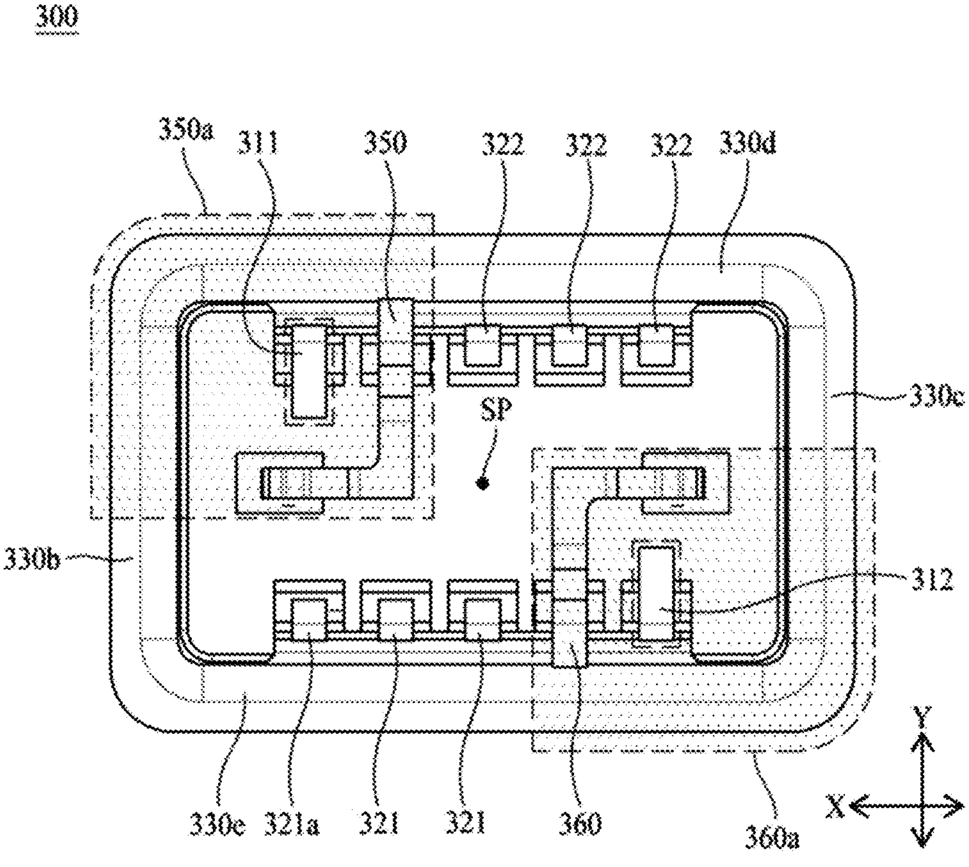
FIG. 12 is a conceptual plan view for explaining a ground loop in the board connector according to the second example.

The second ground contact 360 and the first ground contact 350 may be formed in the same shape as each other. Accordingly, the board connector 300 according to the second example may improve the ease of manufacturing operations of manufacturing each of the second ground contact 360 and the first ground contact 350. In this case, as illustrated in FIG. 12, the second ground contact 360 and the first ground contact 350 may be arranged to be point-symmetrical with respect to a symmetry point SP. The symmetry point SP is a point which is spaced apart from each other by the same distance from each of both sidewalls 330*b*, 330*c* of the ground housing 330 that are disposed to be spaced apart from each other with respect to the first axial direction (X-axis direction), and is additionally spaced apart from each other by the same distance from each of both sidewalls 330*d*, 330*e* of the ground housing 330 that are disposed to be spaced apart from each other with respect to the second axial direction (Y-axis direction). Accordingly, in the board connector 300 according to the second example, since the second ground contact 360 and the first ground contact 350 are formed in the same shape and are implemented only in different arrangement directions, it is possible to further improve the ease of manufacturing operations of manufacturing the second ground contact 360 and the first ground contact 350. In this case, the second RF contact 312 and the first RF contact 311 may be arranged to be point-symmetric with respect to the symmetry point SP.

Figure 13:
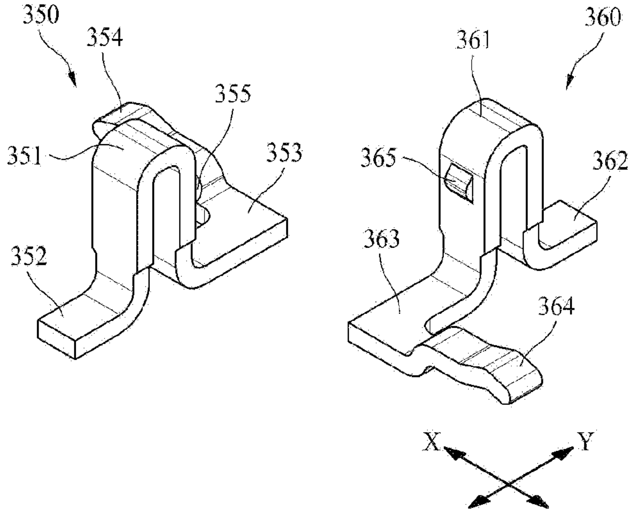
FIG. 13 is a schematic perspective view of a first grounding contact and a second grounding contact in the board connector according to the second example.

Meanwhile, as illustrated in FIGS. 12 and 13, the first connection arm 354 and the second connection arm 364 may be disposed to overlap along the first axial direction (X-axis direction). For example, the first connection arm 354 and the second connection arm 364 may be disposed to be opposite to each other along the first axial direction (X-axis direction). In this case, the first connection arm 354 and the second connection arm 364 may be disposed on the same line. Accordingly, the board connector 300 according to the second example may not only implement a shielding force between the first RF contact 311 and the first transmission contact 321 and a shielding force between the second RF contact 312 and the second transmission contacts 322, but also it is possible to realize miniaturization by reducing the overall size with respect to the first axial direction (X-axis direction).

Referring to FIGS. 10 to 12, in the board connector 300 according to the second example, the ground housing 330 may be implemented as follows.

The ground housing 330 may include a ground side wall 331, a ground upper wall 332 and a ground lower wall 333.

The ground side wall 331 faces the insulating part 240. The ground side wall 331 may be disposed to face the inner space 330*a*. The ground side wall 331 may be disposed to surround all sides of the inner space 330*a* as a reference.

The ground side wall 331 may be connected to a ground housing of a counterpart connector which is inserted into the inner space 330*a*. For example, as illustrated in FIG. 9, the ground side wall 331 may be connected to the ground inner wall 231 of the ground housing 230 of the board connector 200 according to the first example. In this way, the board connector 300 according to the second example may further strengthen the shielding function through the connection between the ground housing 330 and the ground housing of the counterpart connector. In addition, the board connector 300 according to the second example may reduce electrical adverse effects such as crosstalk or the like that may be generated by mutual capacitance or induction between adjacent terminals through the connection between the ground housing 330 and the ground housing of the counterpart connector. In this case, since the board connector 300 according to the second example may secure a path through which electromagnetic waves are introduced to at least one ground of the second board and the first board, it is possible to further strengthen the EMI shielding performance.

The ground upper wall 332 is coupled to the ground side wall 331. The ground upper wall 332 may be coupled to one end of the ground side wall 331. The ground upper wall 332 may protrude from the ground side wall 331 toward the inner space 330*a*. The ground upper wall 332 may be connected to a ground housing of a counterpart connector which is inserted into the inner space 330*a*. Accordingly, in the board connector 300 according to the second example, since the ground upper wall 332 and the ground side wall 331 are connected to the ground housing of the counterpart connector, it is possible to further strengthen the shielding function by increasing the contact area between the ground housing 330 and the ground housing of the counterpart connector. For example, as illustrated in FIG. 9, the ground upper wall 332 may be connected to the ground floor 234 of the ground housing 230 of the board connector 200 according to the first example.

The ground lower wall 333 is coupled to the ground side wall 331. The ground lower wall 333 may be coupled to the other end of the ground side wall 331. The ground lower wall 333 may protrude from the ground side wall 331 to the opposite side of the inner space 330*a*. The ground lower wall 333 may be disposed to surround all sides with respect to the ground side wall 331. The ground lower wall 333 and the ground side wall 331 may be implemented as shield walls surrounding the sides of the inner space 330*a*. The first RF contact 311 and the second RF contact 312 may be positioned in the inner space 330*a* surrounded by the shielding walls. Accordingly, the ground housing 330 may implement a shielding function for the RF contacts 310 by using shielding walls. Therefore, the board connector 300 according to the second example may contribute to further improving EMI shielding performance and EMC performance by using the shielding walls. The lower ground wall 333 may be grounded by being mounted on the second board. In this case, the ground housing 330 may be grounded through the lower ground wall 333.

The ground lower wall 333 and the ground upper wall 332 may be formed in a plate shape disposed in the horizontal direction, and the ground side wall 331 may be formed in a plate shape disposed in the vertical direction. The ground lower wall 333, the ground upper wall 332 and the ground side wall 331 may be integrally formed.

Herein, the ground housing 330 may implement a shielding function for the first RF contact 311 together with the first ground contact 350. The ground housing 330 may implement a shielding function for the second RF contact 312 together with the second ground contact 360.

In this case, as illustrated in FIG. 12, the ground housing 330 may include a first shielding wall 330*b*, a second shielding wall 330*c*, a third shielding wall 330*d* and a fourth shielding wall 330*e*. The first shielding wall 330*b*, the second shielding wall 330*c*, the third shielding wall 330*d* and the fourth shielding wall 330*e* may be implemented by the ground side wall 331, the ground lower wall 333 and the ground upper wall 332, respectively. The first shielding wall 330*b* and the second shielding wall 330*c* are disposed to be opposite to each other with respect to the first axial direction (X-axis direction). The first RF contact 311 and the second RF contact 312 may be positioned between the first shielding wall 330*b* and the second shielding wall 330*c* with respect to the first axial direction (X-axis direction). With respect to the first axial direction (X-axis direction), the first RF contact 311 may be located at a position where the distance away from the first shielding wall 330*b* is shorter than the distance away from the second shielding wall 330*c*. With respect to the first axial direction (X-axis direction), the second RF contact 312 may be located at a position where the distance away from the second shielding wall 330*c* is shorter than the distance away from the first shielding wall 330*b*. The third shielding wall 330*d* and the fourth shielding wall 330*e* may be disposed to be opposite to each other with respect to the second axial direction (Y-axis direction). The first RF contact 311 and the second RF contact 312 may be positioned between the third shielding wall 330*d* and the fourth shielding wall 330*e* with respect to the second axial direction (Y-axis direction).

The first ground contact 350 may be disposed between the first RF contact 311 and the second transmission contact 322 with respect to the first axial direction (X-axis direction). Accordingly, the first RF contact 311 may be positioned between the first shielding wall 330*b* and the first ground mating member 351 of the first ground contact 350 with respect to the first axial direction (X-axis direction), and may be positioned between the third shielding wall 330*d* and the first connection arm 354 of the first ground contact 350 with respect to the second axial direction (Y-axis direction). Accordingly, the board connector 300 according to the second example may strengthen the shielding function for the first RF contact 311 by using the first ground contact 350, the first shielding wall 330*b* and the third shielding wall 330*d*. The first ground contact 350, the first shielding wall 330*b* and the third shielding wall 330*d* may be disposed on four sides with respect to the first RF contact 311 to implement a shielding force for RF signals. In this case, the first ground contact 350, the first shielding wall 330*b* and the third shielding wall 330*d* may implement the first ground loop 350*a* (illustrated in FIG. 12) for the first RF contact 311. Therefore, by further strengthening the shielding function for the first RF contact 311 by using the first ground loop 350*a*, the board connector 300 according to the second example may realize complete shielding for the first RF contact 311.

The second ground contact 360 may be disposed between the second RF contact 312 and the first transmission contacts 321 with respect to the first axial direction (X-axis direction). Accordingly, the second RF contact 312 may be positioned between the second shielding wall 330*c* and the second ground connecting member 361 of the second ground contact 360 with respect to the first axial direction (X-axis direction), and may be positioned between the third shielding wall 330*d* and the second connection arm 364 of the second ground contact 360 with respect to the second axial direction (Y-axis direction). Accordingly, the board connector 300 according to the second example may use the second ground contact 360, the second shielding wall 330*c* and the fourth shielding wall 330*e* to strengthen the shielding function for the second RF contact 312. The second ground contact 360, the second shielding wall 330*c* and the fourth shielding wall 330*e* may be disposed on four sides with respect to the second RF contact 312 to implement a shielding force for RF signals. In this case, the second ground contact 360, the second shielding wall 330*c* and the fourth shielding wall 330*e* may implement the second ground loop 360*a* (illustrated in FIG. 12) for the second RF contact 312. Therefore, by further strengthening the shielding function for the second RF contact 312 by using the second ground loop 360*a*, the board connector 300 according to the second example may realize complete shielding for the second RF contact 312.

Referring to FIG. 11, in the board connector 300 according to the second example, the insulating part 340 may include a soldering inspection window 341.

The soldering inspection window 341 may be formed to pass through the insulating part 340. The soldering inspection window 341 may be used to inspect a state where the RF mounting members 3111, 3121 are mounted on the second board. In this case, the RF contacts 310 may be coupled to the insulating part 340 such that the RF mounting members 3111, 3121 are positioned on the soldering inspection window 341. Accordingly, the RF mounting members 3111, 3121 are not covered by the insulating part 340. Therefore, in a state where the board connector 300 according to the second example is mounted on the second board, the operator may inspect the mounted state of the RF mounting members 3111, 3121 on the second board through the soldering inspection window 341. Accordingly, in the board connector 300 according to the second example, even if all of the RF contacts 310 including the RF mounting members 3111, 3121 are positioned inside the ground housing 330, it is possible to improve the accuracy of the mounting operation of mounting the RF contacts 310 on the second board.

The insulating part 340 may include a plurality of the soldering inspection windows 341. In this case, the RF mounting members 3111, 3121 may be positioned in different soldering inspection windows 341. The transmission mounting members 3201 may be positioned in some of the soldering inspection windows 341. Accordingly, in a state where the board connector 300 according to the second example is mounted on the second board, the operator may inspect the mounted state of the RF mounting members 3111, 3121 and the transmission mounting members 3201 on the second board through the soldering inspection windows 341. Accordingly, the board connector 300 according to the second example may improve the accuracy of mounting the RF mounting members 3111, 3121 and the transmission mounting members 3201 on the second board. The soldering inspection windows 341 may be formed to pass through the insulating part 340 at positions which are spaced apart from each other.

The present disclosure described above is not limited to the above-described exemplary embodiments and the accompanying drawings, and it will be apparent to those of ordinary skill in the art to which the present disclosure pertains that various substitutions, modifications and changes are possible within the scope that does not deviate from the technical spirit of the present disclosure.

The invention claimed is:

1. A board connector, comprising:
- a plurality of radio frequency (RF) contacts for transmitting an RF signal;
- an insulating part for supporting the RF contacts;
- a plurality of transmission contacts coupled to the insulating part;
- a ground housing having the insulating part coupled thereto;
- a first ground contact coupled to the insulating part and shielding between a first RF contact from among the RF contacts and the transmission contacts; and
- a second ground contact coupled to the insulating part and shielding between a second RF contact from among the RF contacts and the transmission contacts,
- wherein the first ground contact comprises:
  - a first shielding member extending along a first axis direction, and the transmission contacts with respect to a second axial direction which is perpendicular to the first axial direction; and
  - a first ground connecting member continuous with the shielding member, and extending along the second axis direction, for shielding between the first RF contact and at least one of the first transmission contacts with respect to the first axial direction.

2. The board connector of claim 1, wherein the first RF contact and the second RF contact are spaced apart from each other with respect to the first axial direction, and are additionally spaced apart from each other with respect to the second axial direction which is perpendicular to the first axial direction, so as to be disposed in non-opposite positions.

3. The board connector of claim 1, wherein the transmission contacts comprise first transmission contacts which are disposed to be spaced apart from the second RF contact with respect to the first axial direction, and second transmission contacts which are disposed to be spaced apart from the first RF contact with respect to the first axial direction, and
- wherein at least one of the first transmission contacts is disposed to be opposite to at least one of the second transmission contacts along the second axial direction.

4. The board connector of claim 3, wherein at least one of the first transmission contacts is disposed to be opposite to the first RF contact with respect to the second axial direction.

5. The board connector of claim 3, wherein at least one of the second transmission contacts is disposed to be opposite to the second RF contact with respect to the second axial direction.

6. The board connector of claim 1, wherein the transmission contacts comprise first transmission contacts which are disposed to be opposite to the first RF contact along the second axial direction, and second transmission contacts which are disposed to be opposite to the second RF contact along the second axial direction, and wherein the first ground contact comprises a first shielding member for shielding between the first RF contact and at least one of the second transmission contacts in the second axial direction.

7. The board connector of claim 6, wherein the first ground connecting member is disposed to be opposite to at least one of the first transmission contacts along the second axial direction.

8. The board connector of claim 6, wherein the first ground contact comprises a first shielding protrusion which protrudes from the first shielding member, and wherein the first shielding protrusion is connected to the insulating part.

9. The board connector of claim 6, wherein the first ground contact comprises a first ground mounting member for mounting on a board, a first connection protrusion for connecting to a ground contact of a counterpart connector, and a first ground protrusion for grounding the first shielding member, wherein the first connection protrusion and the first ground protrusion are coupled to the first shielding member, and wherein the first ground mounting member and the first ground protrusion are mounted on the board at positions spaced apart from each other.

10. The board connector of claim 9, wherein the first ground contact comprises a first ground connecting member coupled to each of the first ground mounting member and the first shielding member, wherein the first shielding member protrudes from the first ground connecting member along the first axial direction, and wherein the first ground mounting member protrudes from the first ground connecting member along the second axial direction.

11. The board connector of claim 1, wherein the board connector comprises a first shielding wall and a second shielding wall which are disposed to be opposite to each other with respect to the first axial direction, and a third shielding wall and a fourth shielding wall which are disposed to be opposite to each other with respect to a second axial direction which is perpendicular to the first axial direction, and wherein the first shielding wall, the third shielding wall and the first ground contact are disposed on four sides based on the first RF contact to implement a shielding force against RF signals.

12. The board connector of claim 1, wherein the transmission contacts comprise a first transmission contact which is disposed to be opposite to the first RF contact along the second axial direction, and a second transmission contact which is disposed to be opposite to the second RF contact along the second axial direction, wherein the first ground contact comprises a first shielding member for shielding between the first RF contact and the first transmission contact in the second axial direction, wherein the second ground contact comprises a second shielding member for shielding between the second RF contact and the second transmission contact in the second axial direction, and wherein the second shielding member is disposed to be opposite to the first shielding member along the first axial direction.

13. The board connector of claim 1, wherein the first ground contact and the second ground contact are disposed to be point-symmetric, based on a symmetry point which is spaced apart by the same distance from each of both side walls of the ground housing which are disposed to be spaced apart from each other with respect to the first axial direction, and additionally spaced apart by the same distance from each of both side walls of the ground housing which are disposed to be spaced apart from each other with respect to the second axial direction.

14. The board connector of claim 1, wherein the ground housing comprises a ground inner wall which faces the insulating part, a ground outer wall which is spaced apart from the ground inner wall, and a ground connection wall which is coupled to each of the ground inner wall and the ground outer wall, and wherein the ground inner wall and the ground outer wall are double shielding walls surrounding the sides of an inner space.

15. The board connector of claim 14, wherein the ground housing comprises a ground floor which protrudes from the ground inner wall toward the inner space, wherein the insulating part comprises an insulating member for supporting the RF contacts and the transmission contacts, and wherein the ground floor is located between the ground inner wall and the insulating member.

16. A board connector, comprising:

a plurality of radio frequency (RF) contacts for transmitting an RF signal;

an insulating part for supporting the RF contacts;

a plurality of transmission contacts coupled to the insulating part;

a ground housing having the insulating part coupled thereto;

a first ground contact coupled to the insulating part and shielding between a first RF contact from among the RF contacts and the transmission contacts; and a second ground contact coupled to the insulating part and shielding between a second RF contact from among the RF contacts and the transmission contacts, wherein a first connection arm extending along a first axial direction and which is connected to a ground contact of a counterpart connector and moves elastically is formed on the first ground contact and the second ground contact, and wherein the first ground contact comprises:

a first ground mating member continuous with the first connection arm and extending along a second axial direction which is perpendicular to the first axial direction, and which is connected to the ground contact of the counterpart connector.

17. The board connector of claim 16, wherein the first ground contact comprises a first ground connecting member which is coupled to each of the first ground mating member and the first connection arm, and wherein as the ground contact of the counterpart connector is connected, the first connection arm is elastically moved based on a portion coupled to the first ground connecting member.

18. The board connector of claim 16, wherein the first ground contact comprises a first ground connecting member which is coupled to each of the first ground mating member and the first connection arm, and wherein the first connection arm is coupled to the first ground connecting member such that an included angle with the first ground connecting member forms an obtuse angle.

19. The board connector of claim 17, wherein the first ground contact comprises a first connection protrusion which protrudes from the first ground mating member, and wherein the first connecting protrusion and the first connection arm are respectively connected to the ground contact of the counterpart connector at different positions.

20. The board connector of claim 17, wherein the first ground contact comprises a first ground mounting member which is coupled to the first ground mating member, and wherein the first ground mounting member protrudes from the first ground mating member along the second axial direction.

* * * * *